US009554150B2

(12) United States Patent
Zhang et al.

(10) Patent No.: US 9,554,150 B2
(45) Date of Patent: Jan. 24, 2017

(54) COMBINED BI-PREDICTIVE MERGING CANDIDATES FOR 3D VIDEO CODING

(71) Applicant: QUALCOMM Incorporated, San Diego, CA (US)

(72) Inventors: Li Zhang, San Diego, CA (US); Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 198 days.

(21) Appl. No.: 14/489,679

(22) Filed: Sep. 18, 2014

(65) Prior Publication Data

US 2015/0085930 A1    Mar. 26, 2015

Related U.S. Application Data

(60) Provisional application No. 61/880,737, filed on Sep. 20, 2013.

(51) Int. Cl.
| | | |
|---|---|---|
| *H04N 7/12* | (2006.01) | |
| *H04N 15/00* | (2006.01) | |
| *H04N 19/52* | (2014.01) | |
| *H04N 19/136* | (2014.01) | |
| *H04N 19/44* | (2014.01) | |
| *H04N 19/50* | (2014.01) | |
| *H04N 19/597* | (2014.01) | |

(Continued)

(52) U.S. Cl.
CPC ............ *H04N 19/52* (2014.11); *H04N 19/136* (2014.11); *H04N 19/44* (2014.11); *H04N 19/50* (2014.11); *H04N 19/56* (2014.11); *H04N 19/577* (2014.11); *H04N 19/597* (2014.11); *H04N 19/70* (2014.11)

(58) Field of Classification Search
CPC ...... H04N 19/52; H04N 19/136; H04N 19/50; H04N 19/70
See application file for complete search history.

(56) References Cited

U.S. PATENT DOCUMENTS

| | | | | |
|---|---|---|---|---|
| 8,917,772 B2* | 12/2014 | Oh | ........................ | H04N 19/463 |
| | | | | 375/240.16 |
| 2012/0230408 A1* | 9/2012 | Zhou | .................... | H04N 19/105 |
| | | | | 375/240.15 |

(Continued)

OTHER PUBLICATIONS

Tech Get al: "3D-HEVC Draft Text 1",5. JCT-3V Meeting; Jul. 27, 2013—Aug. 2, 2013; Vienna; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-E1001-v3, Sep. 11, 2013 (Sep. 11, 2013 ), XP030131378.*

(Continued)

*Primary Examiner* — Leron Beck
*Assistant Examiner* — Tsion B Owens
(74) *Attorney, Agent, or Firm* — Shumaker & Sieffert, P.A.

(57) ABSTRACT

A video coder generates a list of merging candidates for coding a video block of the 3D video. A maximum number of merging candidates in the list of merging candidates may be equal to 6. As part of generating the list of merging candidates, the video coder determines whether a number of merging candidates in the list of merging candidates is less than 5. If so, the video coder derives one or more combined bi-predictive merging candidates. The video coder includes the one or more combined bi-predictive merging candidates in the list of merging candidates.

24 Claims, 14 Drawing Sheets

(51) Int. Cl.
*H04N 19/56* (2014.01)
*H04N 19/70* (2014.01)
*H04N 19/577* (2014.01)

(56) References Cited

U.S. PATENT DOCUMENTS

2016/0057453 A1* 2/2016 Chang .................. H04N 19/597
375/240.12
2016/0134891 A1* 5/2016 Lee ...................... H04N 19/597
375/240.08

OTHER PUBLICATIONS

Wiegand et al., "WD1: Working Draft 1 of High-Efficiency Video Coding," JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, CH, Nov. 21-30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High Efficiency Video Coding (HEVC) text specification draft 9," 11th Meeting: Shanghai, CN, Oct. 10-19, 2012, JCTVC-K1003_v7, 290 pp.
Bross et al., "High Efficiency Video Coding (HEVC) text specification draft 10 (for FDIS & Last Call)," 12th Meeting: Geneva, CH, Jan. 14-23, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Bross et al., "Editors' proposed corrections to HEVC version 1," Joint Collaborative Team on Video Coding (JCT-VC) of ITU-T SG16 WP3 and ISO/IEC JTC1/SC29/WG11, 13th Meeting, Incheon, KR, Apr. 18-26, 2013, JCTVC-M0432_v3, XP030057924, 310 pp.
Kim et al., "High Efficiency Video Coding (HEVC) Test Model 11 (HM11) Encoder Description," JCT-VC Meeting; MPEG Meeting; Apr. 18-26, 2013; Incheon, KR; (Joint Collaborative Team on Video Coding of ISO/IEC JTC1/SC29/WG11 and ITU-T SG.16); XP030114426, 36 pp.

Tech et al.,"3D-HEVC Draft Text 1," JCT-3V Meeting; Jul. 27-Aug. 2, 2013; Vienna, AT; (The Joint Collaborative Team on 3D Video Coding Extension Development of ISO/IEC JTC1/SC29/WG11 and ITU-T SG.16); URL: http://phenix.int-evry.fr/jct2/, No. JCT3V-E1001-v3, XP030131378, 89 pp.
Zhang et al., "CE3 related: combined bi-predictive merging candidates for 3D-HEVC," JCT-3V Meeting; Oct. 25-Nov. 1, 2013; Geneva, CH; (The Joint Collaborative Team on 3D Video Coding Extension Development of ISO/IEC JTC1/SC29/WG11 and ITU-T SG.16); URL: http://phenix.int-evry.fr/jct2/,, No. JCT3V-F0129, XP030131555, 5 pp.
Zhang et al., "3D-HEVC Test Model 5," JCT-3V Meeting; Jul. 27-Aug. 2, 2013; Vienna, AT; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-E1005, XP030131385, 50 pp.
Zhang et al., "CE5.h: Disparity vector generation results," JCT2-A0097, JCT-3V Meeting; MPEG Meeting; Jul. 16-20, 2012; Stockholm, SE; (The Joint Collaborative Team on 3D Video Coding Extension Development of ISO/IEC JTC1/SC29/WG11 and ITU-T SG.16); URL: http://phenix.int-evry.fr/jct2/, XP030130096, 5 pp.
Tian et al.,"CE1.h: Backward View Synthesis Prediction using Neighbouring Blocks," JCT-3V Meeting; MPEG Meeting; Jan. 16-23, 2013; Geneva, CH; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-C0152, XP030130568, 5 pp.
Tian et al.,"CE1.h: Backward View Synthesis Prediction using Neighbouring Blocks," JCT-3V Meeting; MPEG Meeting; Jan. 17-23, 2013; Geneva, CH; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-C0152, XP030130568, 5 pp.
Tech et al., "3D-HEVC Test Model 2," JCT-3V Meeting; MPEG Meeting; Oct. 13-19, 2012; (The Joint Collaborative Team on 3D Video Coding Extension Development of ISO/IEC JTC1/SC29/WG11 and ITU-T SG.16 ); Document: JCT3V-B1005_d0, 70 pp.
Tech et al., "3D-HEVC Test Model 2," JCT-3V Meeting; MPEG Meeting; Oct. 13-19, 2012; (The Joint Collaborative Team on 3D Video Coding Extension Development of ISO/IEC JTC1/SC29/WG11 and ITU-T SG.16 ); Document: JCT3V-B1005_d0_r1, 126 pp.
Tech et al., "3D-HEVC Test Model 3," JCT-3V Meeting; MPEG Meeting; Jan. 17-23, 2013; (The Joint Collaborative Team on 3D Video Coding Extension Development of ISO/IEC JTC1/SC29/WG11 and ITU-T SG.16 ); Document: JCT3V-C1005_d0, 51 pp.
Tech et al., "3D-HEVC Test Model 3," JCT-3V Meeting; MPEG Meeting; Jan. 17-23, 2013; Geneva, CH; (The Joint Collaborative Team on 3D Video Coding Extension Development of ISO/IEC JTC1/SC29/WG11 and ITU-T SG.16 ); Document: JCT3V-C1005_spec_d1, 91 pp.
Chang et al., "3D-CE2.h related: Simplified DV derivation for DoNBDV and BVSP," MPEG Meeting; Apr. 20-26, 2013; (The Joint Collaborative Team on 3D Video Coding Extension Development of ISO/IEC JTC1/SC29/WG11 and ITU-T SG.16 ); Document: JCT3V-D0138, 4 pp.
Thirumalai et al., "CE3.h: Merge candidates derivation from vector shifting," MPEG Meeting; Jul. 27-Aug. 2, 2013; , Vienna, AT; (The Joint Collaborative Team on 3D Video Coding Extension Development of ISO/IEC JTC1/SC29/WG11 and ITU-T SG.16 ); Document: JCT3V-E0126, 5 pp.
Thirumalai et al., "Proposed text for JCT3V-E0126 based on 3D-HEVC Test Model," MPEG Meeting; Jul. 27-Aug. 2, 2013; Vienna, AT; (The Joint Collaborative Team on 3D Video Coding Extension Development of ISO/IEC JTC1/SC29/WG11 and ITU-T SG.16 ); Document: JCT3V-E0126_proposed text, 5 pp.
International Search Report and Written Opinion from International Application No. PCT/US2014/056557, dated Dec. 1, 2014, 11 pp.
Response to Written Opinion dated Dec. 1, 2014, from International Application No. PCT/US2014/056557, filed on Jan. 27, 2015, 7 pp.
Second Written Opinion from International Application No. PCT/US2014/056557, dated Aug. 6, 2015, 5 pp.

(56) References Cited

OTHER PUBLICATIONS

Response to Second Written Opinion dated Aug. 6, 2015 from International Application No. PCT/US2014/056557, filed on Oct. 6, 2015, 6 pp.
International Preliminary Report on Patentability from International Application No. PCT/US2014/056557, dated Dec. 18, 2015, 8 pp.

* cited by examiner

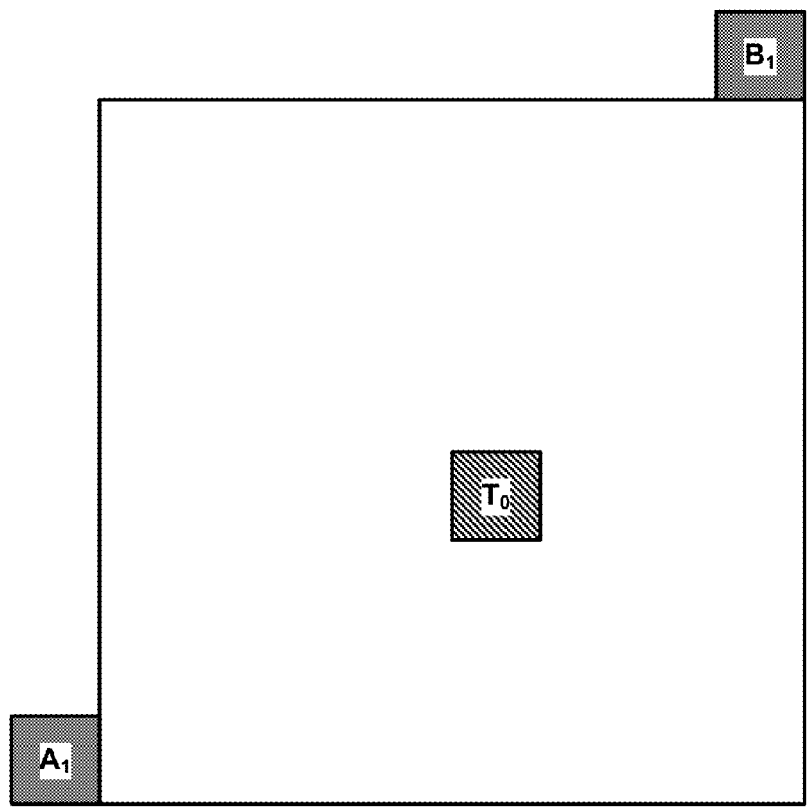
 Spatial neighboring block
 Temporal neighboring block
FIG. 3

| combIdx  | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| l0CandIdx | 0 | 1 | 0 | 2 | 1 | 2 | 0 | 3 | 1 | 3 | 2 | 3 | 0 | 4 | 1 | 4 | 2 | 4 | 3 | 4 |
| l1CandIdx | 1 | 0 | 2 | 0 | 2 | 1 | 3 | 0 | 3 | 1 | 3 | 2 | 4 | 0 | 4 | 1 | 4 | 2 | 4 | 3 |

FIG. 7

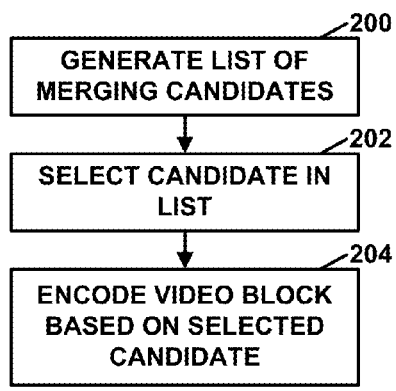
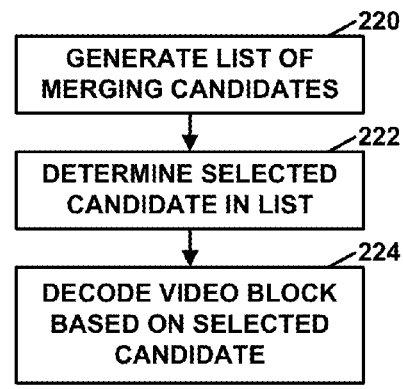
FIG. 10A                    FIG. 10B

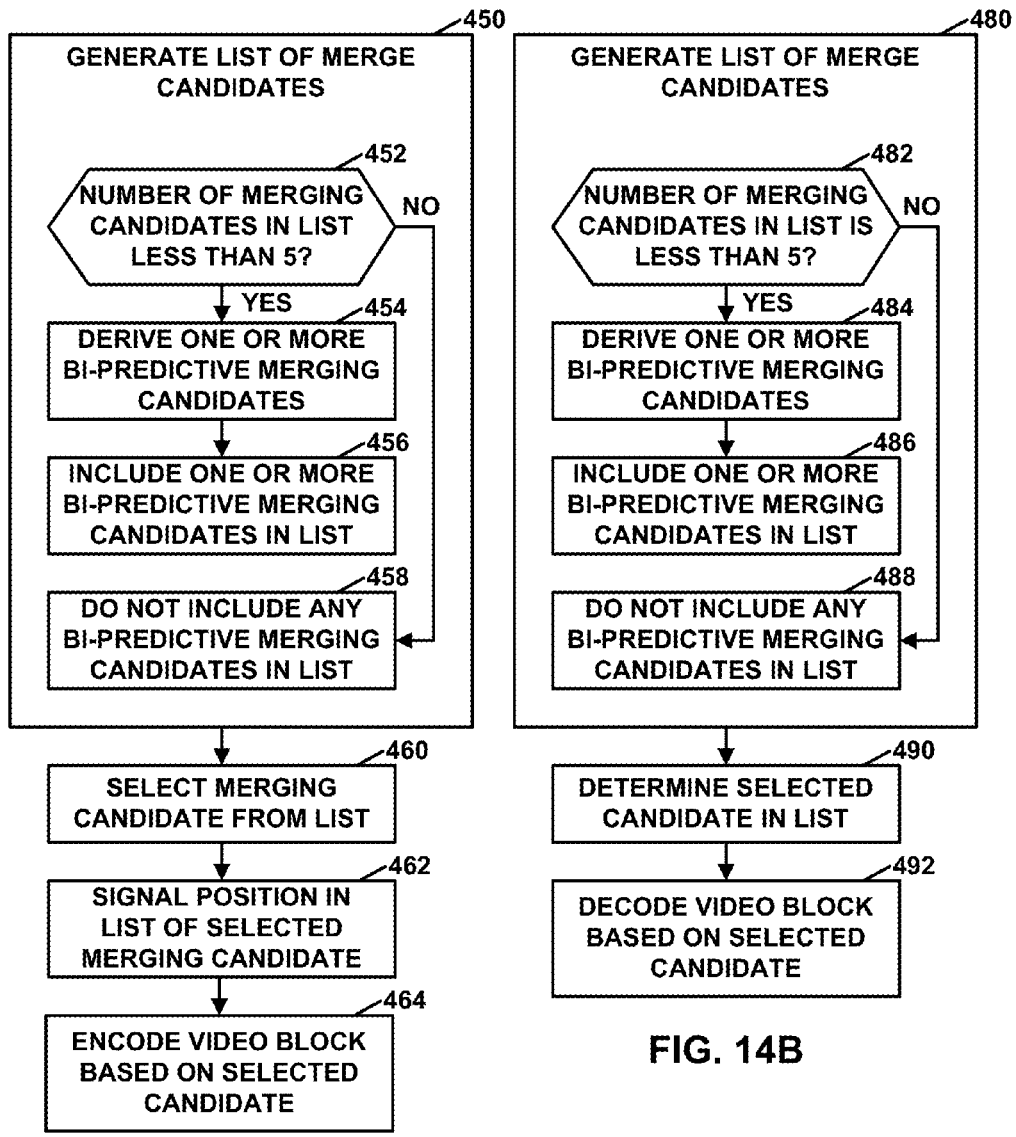

US 9,554,150 B2

COMBINED BI-PREDICTIVE MERGING CANDIDATES FOR 3D VIDEO CODING

This application claims the benefit of U.S. Provisional Patent Application No. 61/880,737, filed Sep. 20, 2013, the entire content of which is incorporated herein by reference.

TECHNICAL FIELD

This disclosure relates to video coding and compression, and more specifically, coding techniques that may be used in coding three-dimensional (3D) video.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards, to transmit, receive and store digital video information more efficiently.

Video compression techniques perform spatial (intra-picture) prediction and/or temporal (inter-picture) prediction to reduce or remove redundancy inherent in video sequences. For block-based video coding, a video slice may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

A multi-view coding bitstream may be generated by encoding views, e.g., from multiple perspectives. Multi-view coding may allow a decoder to choose between different views, or possibly render multiple views. Moreover, some three-dimensional (3D) video techniques and standards that have been developed, or are under development, make use of multi-view coding aspects. Three dimensional video is also referred to as "3DV."

For example, different views may transmit left and right eye views to support 3D video. Alternatively, some 3D video coding processes may apply so-called multi-view plus depth coding. In multi-view plus depth coding, a 3D video bitstream may contain not only texture view components, but also depth view components. For example, each view may comprise one texture view component and one depth view component.

Currently, a Joint Collaboration Team on 3D Video Coding (JCT-3C) of VCEG and MPEG is developing a 3D video standard based on the emerging standard referred to as "high efficiency video coding (HEVC)," for which part of the standardization efforts includes the standardization of the multi-view video codec based on HEVC (MV-HEVC) and another part for 3D Video coding based on HEVC (3D-HEVC). 3D-HEVC may include and support new coding tools, including those in coding unit/prediction unit level, for both texture and depth views.

SUMMARY

In general, this disclosure relates to three-dimensional (3D) video coding based on advanced codecs, including the coding of two or more views with the 3D-High Efficiency Video Coding (HEVC) codec. For instance, some examples of this disclosure describe techniques related to combined bi-predictive merging candidates. In some such examples, as part of generating a list of merging candidates, a video coder determines whether a number of merging candidates in the list is less than 5. If so, the video coder derives one or more combined bi-predictive merging candidates. The video coder includes the one or more combined bi-predictive merging candidates in the list of merging candidates.

In one aspect, this disclosure describes a method of coding 3D video data. The method comprises generating a list of merging candidates for coding a video block of the 3D video data. A maximum number of merging candidates in the list of merging candidates is equal to 6 and generating the list of merging candidates comprises: determining whether a number of merging candidates in the list of merging candidates is less than 5; and in response to determining that the number of merging candidates in the list of merging candidates is less than 5: deriving one or more combined bi-predictive merging candidates, wherein each respective combined bi-predictive merging candidate of the one or more combined bi-predictive merging candidates corresponds to a respective pair of merging candidates already in the list of merging candidates, wherein the respective combined bi-predictive merging candidate is a combination of a motion vector of a first merging candidate of the respective pair and a motion vector of a second merging candidate of the respective pair, wherein the motion vector of the first merging candidate and the motion vector of the second merging candidate refer to pictures in different reference picture lists. The method also comprises including the one or more combined bi-predictive merging candidates in the list of merging candidates.

In another aspect, this disclosure describes a video coding device comprising: a data storage medium configured to store 3D video data; and one or more processors configured to: generate a list of merging candidates for coding a video block of the 3D video data, wherein a maximum number of merging candidates in the list of merging candidates is equal to 6 and as part of generating the list of merging candidates, the one or more processors: determine whether a number of merging candidates in the list of merging candidates is less than 5; and in response to determining that the number of merging candidates in the list of merging candidates is less than 5: derive one or more combined bi-predictive merging candidates, wherein each respective combined bi-predictive merging candidate of the one or more combined bi-predictive merging candidates corresponds to a respective pair of merging candidates already in the list of merging candidates, wherein the respective combined bi-predictive merging candidate is a combination of a motion vector of a first merging candidate of the respective pair and a motion vector of a second merging candidate of the respective pair, wherein the motion vector of the first merging candidate and the motion vector of the second merging candidate refer to pictures in different reference picture lists. The one or more processors are configured to include the one or more combined bi-predictive merging candidates in the list of merging candidates.

In another aspect, this disclosure describes a video coding device comprising: means for generating a list of merging candidates for coding a video block of 3D video data. A maximum number of merging candidates in the list of merging candidates is equal to 6 and the means for generating the list of merging candidates comprises: means for determining whether a number of merging candidates in the list of merging candidates is less than 5; means for deriving, in response to determining that the number of merging candidates in the list of merging candidates is less than 5, one or more combined bi-predictive merging candidates, wherein each respective combined bi-predictive merging candidate of the one or more combined bi-predictive merging candidates corresponds to a respective pair of merging candidates already in the list of merging candidates, wherein the respective combined bi-predictive merging candidate is a combination of a motion vector of a first merging candidate of the respective pair and a motion vector of a second merging candidate of the respective pair, wherein the motion vector of the first merging candidate and the motion vector of the second merging candidate refer to pictures in different reference picture lists. The video coding device also comprises means for including the one or more combined bi-predictive merging candidates in the list of merging candidates.

In another aspect, this disclosure describes a computer-readable data storage medium having instructions stored thereon that when executed cause a video coding device to 3D video data, the instructions causing the video coding device to: generate a list of merging candidates for coding a video block of the 3D video data. A maximum number of merging candidates in the list of merging candidates is equal to 6. Generating the list of merging candidates comprises: determining whether a number of merging candidates in the list of merging candidates is less than 5; and in response to determining that the number of merging candidates in the list of merging candidates is less than 5: deriving one or more combined bi-predictive merging candidates, wherein each respective combined bi-predictive merging candidate of the one or more combined bi-predictive merging candidates corresponds to a respective pair of merging candidates already in the list of merging candidates, wherein the respective combined bi-predictive merging candidate is a combination of a motion vector of a first merging candidate of the respective pair and a motion vector of a second merging candidate of the respective pair, wherein the motion vector of the first merging candidate and the motion vector of the second merging candidate refer to pictures in different reference picture lists; and including the one or more combined bi-predictive merging candidates in the list of merging candidates.

The details of one or more examples are set forth in the accompanying drawings and the description below. Other features, objects, and advantages will be apparent from the description, drawings, and claims.

BRIEF DESCRIPTION OF DRAWINGS

FIG. 3 is a conceptual diagram illustrating spatial and temporal neighboring blocks relative to a current coding unit.

FIG. 7 is a table providing an example specification of l0CandIdx and l1CandIdx in 3D-HEVC.

FIG. 10A is a flowchart illustrating an example operation of a video encoder to encode data associated with 3D video, in accordance with one or more techniques of this disclosure.

FIG. 10B is a flowchart illustrating an example operation of a video decoder to decode data associated with 3D video, in accordance with one or more techniques of this disclosure.

FIG. 14A is a flowchart illustrating an example operation of a video encoder to encode a video block, in accordance with one or more techniques of this disclosure.

FIG. 14B is a flowchart illustrating an example operation of a video decoder to decode a video block, in accordance with one or more techniques of this disclosure.

DETAILED DESCRIPTION

Figure 1:
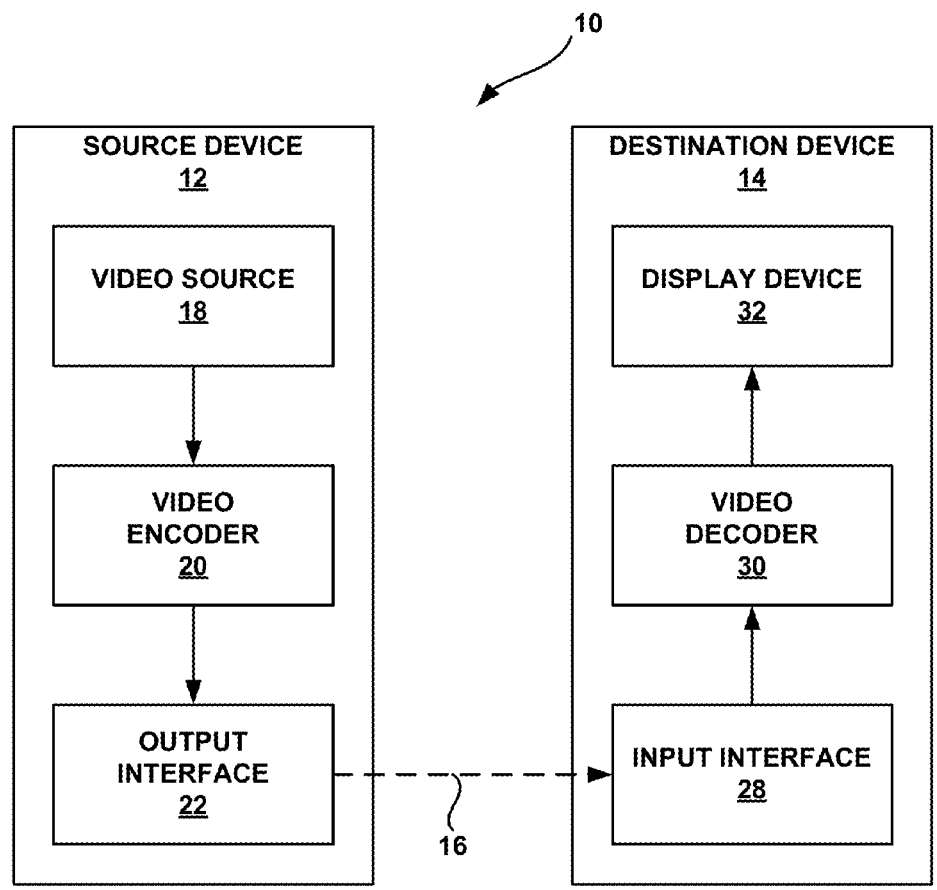
FIG. 1 is a block diagram illustrating an example video coding system that may utilize the techniques of this disclosure.

Video encoding is a process of transforming video data into encoded video data. In general, video decoding reverses the transformation, thereby reconstructing the video data. Video encoding and video decoding may both be referred to as video coding. Block-based video coding is a type of video coding that operates, at least in part, on blocks of video data within pictures.

Inter prediction is a video coding technique in which a video encoder determines, based on samples of a reference picture, a predictive block for a current block (i.e., a block that the video encoder is currently coding). The reference picture is a picture other than the picture that the video encoder is currently coding. The video encoder may include, in a bitstream, data representing residual data for the block. The residual data for the block indicates differences between the current block and the predictive block. A motion vector for the block may indicate a spatial displacement between the current block and the predictive block. A reference index may indicate the location of the reference picture within a list of reference pictures available for use in coding the current picture. Reference indices may also be referred to as "reference picture indices." A video decoder may use a motion vector of the current block to determine the predictive block for the current block. Furthermore, the video decoder may combine the predictive block with the residual data for the current block to reconstruct the current block.

In bi-directional inter prediction, the video encoder determines two predictive blocks for a current block. Accordingly, the video encoder also determines two motion vectors for the current block. The two predictive blocks for the current block may be in different reference pictures. Hence, in bi-directional inter prediction, the video encoder may determine two reference indices for the current block (i.e., a first reference index and a second reference index). The first and second reference indices indicate the locations of reference pictures within a first and a second reference picture list, respectively. The residual data for the current block may indicate differences between the current block and a synthesized predictive block that is based on the two predictive blocks for the current block.

The motion vectors of a current block may be similar to the motion vectors of blocks that spatially or temporally neighbor the current block (i.e., neighbor blocks). Hence, it may be unnecessary for a video encoder to explicitly signal the motion vectors and reference indices of the current block. Rather, the video encoder may determine a list of merging candidates for the current block (i.e., a "merging candidate list" or a "merge candidate list"). Each of the merging candidates specifies a set of motion information (e.g., one or more motion vectors, one or more reference indices, etc.). The list of merging candidates may include one or more merging candidates that respectively specify motion information of different ones of the neighboring blocks. Neighboring blocks may include spatial neighboring blocks and/or temporal neighboring blocks. This disclosure may refer to merging candidates based on spatial neighboring blocks as spatial merging candidates. This disclosure may refer to merging candidates based on temporal neighboring blocks as temporal merging candidates. In some examples, two merging candidates in the list of merging candidates may have identical motion information. The video encoder may select one of the merging candidates and may signal a syntax element that indicates a position within the merging candidate list of the selected merging candidate.

The video decoder may generate the same merging candidate list (i.e., a merge candidate list duplicative of the merging candidate list determined by the video encoder) and may determine, based on receipt of the signaled syntax element, the selected merging candidate. The video decoder may then use the motion information of the selected merging candidate as the motion information of the current block. In this way, the current block may inherit the motion information of one of the neighboring blocks.

In some circumstances, the motion information of a neighboring block may be unavailable. For example, the neighboring block may be coded using intra prediction, the neighboring block may be in a different slice, or the neighboring block may simply not exist. Hence, there may be fewer than a required number of merging candidates (e.g., the maximum number of merging candidates, which may be indicated in a slice header) in the merging candidate list for the current block. Accordingly, when a video coder (e.g., a video encoder or a video decoder) generates the merging candidate list for the current block, the video coder may ensure that the merging candidate list for the current block includes the desired number of merging candidates by including one or more artificial merging candidates in the merging candidate list for the current block. The artificial merging candidates are merging candidates that do not necessarily specify the motion information of any spatial or temporal neighboring block.

The artificial merging candidates may include one or more combined bi-predictive merging candidates. As indicated above, a merging candidate may specify two motion vectors and two reference indices. A combined bi-predictive merging candidate corresponds to a respective pair of merging candidates already in the list of merging candidates for the current block. Specifically, the combined bi-predictive merging candidate is a combination of a motion vector and reference index of a first merging candidate of the respective pair, if available, and a motion vector and reference index of a second merging candidate of the respective pair, if available. The motion vector of the first merging candidate and the motion vector of the second merging candidate refer to pictures in different reference picture lists. Thus, combined bi-predictive merging candidates may correspond to different combinations of motion vectors/reference indices from different existing merging candidates (e.g., merging candidates other than combined bi-predictive merging candidates, such as spatial or temporal merging candidates). For example, when the RefPicList0 motion information of a first merging candidate and a RefPicList1 motion information of a second merging candidate are both available and not identical (i.e., either reference pictures are different or motion vectors are different), one combined bi-predictive merging candidate is constructed. Otherwise, a next respective pair is checked.

In some versions of the HEVC specification, the maximum value of the required number of merging candidates in a list of merging candidates is 5. Furthermore, in some instances, the desired number of merging candidates in a list of merging candidates is 5. Hence, if there are fewer than 5 merging candidates in the merging candidate list prior to including combined bi-predictive merging candidates in the merging candidate list, there are up to twelve (i.e., 4*3) possible combinations of motion vectors usable in combined bi-predictive merging candidates. The selection of a respective pair (i.e., which candidate is the first candidate and which candidate is the second candidate) is pre-defined in HEVC as shown in the following table:

| combIdx | 0 | 1 | 2 | 3 | 4 | 5 | 6 | 7 | 8 | 9 | 10 | 11 |
|---|---|---|---|---|---|---|---|---|---|---|---|---|
| l0CandIdx | 0 | 1 | 0 | 2 | 1 | 2 | 0 | 3 | 1 | 3 | 2 | 3 |
| l1CandIdx | 1 | 0 | 2 | 0 | 2 | 1 | 3 | 0 | 3 | 1 | 3 | 2 |

In the table above, l0CandIdx represents the index of the selected first existing merging candidate, l1CandIdx represents the index of the selected second existing merging candidate, and combIdx represents the constructed combined bi-predictive candidate index.

Multi-layer video coding allows video coding across multiple layers. Multi-layer video coding may be used to implement scalable video coding, multi-view video coding, and 3-dimensional (3D) video coding. In multi-view video coding and 3D video coding, each of the layers may correspond to a different viewpoint. In some video coding standards, the required number of merging candidates in a merging candidate list is greater when using multi-layer video coding than when using single layer video coding. The greater number of merging candidates may be allowed in order to accommodate merging candidates specifying motion information of blocks in different views.

As in the case of single layer video coding, when a video coder is using multi-layer coding and the number of merging candidates in a merging candidate list is less than a desired number of merging candidates, the video coder may generate one or more combined bi-predictive merging candidates. However, due to the larger number of merging candidates when using multi-layer coding, there is a greater number of combinations of motions vectors usable in the combined bi-predictive merging candidates. For example, if the required number of merging candidates is 6, there are up to twenty (5*4) possible combinations of motion vectors usable in combined bi-predictive merging candidates.

A video coder may not be able to generate a combined bi-predictive merging candidate from particular pairs of merging candidates. For example, the video coder may not be able to generate a combined bi-predictive merging candidate if one of the merging candidates only has a single motion vector and a single reference index. In order to determine whether a combined bi-predictive merging candidate can be generated from motion information of a particular pair of merging candidates, the video coder may need to retrieve information about the pair of merging candidates from a memory.

Retrieving information from memory may be a comparatively slow process relative to other coding processes. Moreover, access to memory requires power. Therefore, limiting the number of accesses to memory may be desirable. As the number of combinations of motion vectors usable in combined bi-predictive merging candidates increases, the amount of information that needs to be retrieved from memory increases. Thus, the increase in the required number of merging candidates associated with multi-view video coding may significantly slow the video coding process and may use more power than would otherwise be used.

Hence, in accordance with an example of this disclosure, a video coder may generate a list of merging candidates for coding a video block of 3D video in a way that can limit the accesses to memory. Furthermore, in this example, as part of generating the list of merging candidates, the video coder may determine whether a number of merging candidates in the list is less than 5. In response to determining that the number of merging candidates in the list is less than 5, the video coder may derive one or more combined bi-predictive merging candidates. In this example, each respective combined bi-predictive merging candidate of the one or more combined bi-predictive merging candidates corresponds to a respective pair of merging candidates already in the list. Furthermore, in this example, the respective combined bi-predictive merging candidate is a combination of a motion vector of a first merging candidate of the respective pair and a motion vector of a second merging candidate of the respective pair. In this example, the motion vector of the first merging candidate and the motion vector of the second merging candidate refer to pictures in different reference picture lists. The video coder may include the one or more combined bi-predictive merging candidates in the list. In some examples, a maximum number of merging candidates in the list is greater than 5 (e.g., equal to 6). An effect of the process of this example is that the number of combinations remains limited to 12, even though the maximum number of merging candidates in the list is 6 or more. This may help accelerate the coding process by reducing the amount of information retrieved from memory and may also save power.

FIG. 1 is a block diagram illustrating an example video coding system 10 that may utilize the techniques of this disclosure. As described herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). Channel 16 may include various types of devices, such as routers, switches, base stations, or other equipment that facilitate communication from source device 12 to destination device 14.

In another example, channel 16 may include a storage medium that stores encoded video data generated by source device 12. In this example, destination device 14 may access the storage medium via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device. In accordance with this disclosure, video encoder 20 and video decoder 30 may perform one or more techniques described herein as part of a video coding process (e.g., video encoding or video decoding).

FIG. 1 is merely an example and the techniques of this disclosure may apply to video coding settings (e.g., video encoding or video decoding) that do not necessarily include any data communication between the video encoding device and the video decoding device. In other examples, data is retrieved from a local memory, streamed over a network, or the like. A video encoding device may encode and store data to memory, and/or a video decoding device may retrieve and decode data from memory. In many examples, the video encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which a video decoding device may then retrieve at any time after being stored to this medium. In some examples, from an encoder perspective, signaling may include generating an encoded bitstream, and from a decoder perspective, signaling may include receiving and parsing a coded bitstream.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010. In other examples, video encoder 20 and video decoder 30 may operate according to other video coding standards including ITU-T H.261, ISO/IEC MPEG-1 Visual, ITU-T H.262 or ISO/IEC MPEG-2 Visual, ITU-T H.263, and so on. The techniques of this disclosure, however, are not limited to any particular coding standard or technique.

In other examples, video encoder 20 and video decoder 30 may operate according to other video compression standards, including the High Efficiency Video Coding (HEVC) standard developed by the Joint Collaboration Team on Video Coding (JCT-VC) of ITU-T Video Coding Experts Group (VCEG) and ISO/IEC Motion Picture Experts Group (MPEG). A draft of the HEVC standard, referred to as "HEVC Working Draft 9," is described in Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, China, October, 2012, is downloadable from http://phenix.int-evry.fr/jct/doc_end_user/documents/11_Shanghai/wg11/JCTVC-K1003-v8.zip. Another recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan. 2013, which is downloadable from http://phenix.int-evry.fr/jct/doc_end_user/documents/12_Geneva/wg11/JCTVC-L1003-v34.zip. Yet another draft of the HEVC standard, is referred to herein as "WD10 revisions" described in Bross et al., "Editors' proposed corrections to HEVC version 1," Joint Collaborative Team on Video Coding (JCT-VC) of ITU-T SG16 WP3 and ISO/IEC JTC1/SC29/WG11, $13^{th}$ Meeting, Incheon, KR, April 2013, which is available from http://phenix.int-evry.fr/jct/doc_end_user/documents/13_Incheon/wg11/JCTVC-M0432-v3.zip.

Currently, a Joint Collaboration Team on 3D Video Coding (JCT-3C) of VCEG and MPEG is developing a 3DV standard based on HEVC, for which part of the standardization efforts includes the standardization of the multi-view video codec based on HEVC (MV-HEVC) and another part for 3D Video coding based on HEVC (3D-HEVC). For 3D-HEVC, new coding tools, including those at the coding unit/prediction unit level, for both texture and depth views may be included and supported. Software for 3D-HEVC (i.e., 3D-HTM) can be downloaded from the following link: [3D-HTM version 8.0]: https://hevc.hhi.fraunhofer.de/svn/svn_3DVCSoftware/tags/HTM-8.0/ A working draft of 3D-HEVC (i.e., Tech et al., "3D-HEVC Draft Text 1," Joint Collaborative Team on 3D Video Coding Extension Development of ITU-T SG 16 WP 3 and ISO/IEC JTC 1/SC 29/WG 11, $5^{th}$ Meeting, Vienna, AT, 27 Jul.-2 Aug. 2013, document number: JCT3V-E1001-v2 (hereinafter, "JCT3V-E1001" or "3D-HEVC Draft Text 1")) is available from: http://phenix.it-sudparis.eu/jct2/doc_end_user/documents/5Vienna/wg11/JCT3V-E1001-v3.zip. A software description of 3D-HEVC (Zhang et al., "3D-HEVC Test Model 3," Joint Collaborative Team on 3D Video Coding Extension Development of ITU-T SG 16 WP 3 and ISO/IEC JTC 1/SC 29/WG 11, $3^{rd}$ Meeting, Geneva, CH, 17-23 Jan. 2013, document number: JCT3V-C1005_d0 (hereinafter, "JCT3V-C1005" or "3D-HEVC Test Model 3")) is available from: http://phenix.int-evry.fr/jct3v/doc_end_user/documents/3Geneva/wg11/JCT3V-C1005-v2.zip. Another software description of 3D-HEVC (Zhang et al., "3D-HEVC Test Model 5," Joint Collaborative Team on 3D Video Coding Extension Development of ITU-T SG 16 WP 3 and ISO/IEC JTC 1/SC 29/WG 11, $5^{th}$ Meeting, Vienna, AT, 27 Jul.-2 Aug. 2013, document number: JCT3V-E1005 (hereinafter, "JCT3V-E1005") is available from: http://phenix.it-sudparis.eu/jct2/doc_end_user/current_document.php?id=1360.

As mentioned briefly above, video encoder 20 encodes video data. The video data may comprise one or more pictures. Each of the pictures is a still image forming part of a video. When video encoder 20 encodes the video data, video encoder 20 may generate a bitstream. The bitstream may include a sequence of bits that form a coded representation of the video data. The bitstream may include coded pictures and associated data. A coded picture is an encoded representation of a picture. The associated data may include sequence parameter sets (SPSs), picture parameter sets (PPSs), video parameter sets (VPSs), adaptive parameter sets (APSs), slice headers, block headers, and other syntax structures.

A picture may include three sample arrays, denoted $S_L$, $S_{Cb}$ and $S_{Cr}$. $S_L$ is a two-dimensional array (i.e., a block) of luma samples. Luma samples may also be referred to herein as "Y" samples. $S_{Cb}$ is a two-dimensional array of Cb chrominance samples. $S_{Cr}$ is a two-dimensional array of Cr chrominance samples. Chrominance samples may also be referred to herein as "chroma" samples. Cb chrominance samples may be referred to herein as "U samples." Cr chrominance samples may be referred to herein as "V samples."

In some examples, video encoder 20 may down-sample the chroma arrays of a picture (i.e., $S_{Cb}$ and $S_{Cr}$). For example, video encoder 20 may use a YUV 4:2:0 video format, a YUV 4:2:2 video format, or a 4:4:4 video format. In the YUV 4:2:0 video format, video encoder 20 may down-sample the chroma arrays such that the chroma arrays are ½ the height and ½ the width of the luma array. In the YUV 4:2:2 video format, video encoder 20 may down-sample the chroma arrays such that the chroma arrays are ½ the width and the same height as the luma array. In the YUV 4:4:4 video format, video encoder 20 does not down-sample the chroma arrays.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. In a monochrome picture or a picture that has three separate color planes, a CTU may comprise a single coding tree block and syntax structures used to code the samples of the coding tree block. A coding tree block (CTB) may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs).

As part of encoding a picture, video encoder 20 may generate encoded representations of each slice of the picture (i.e., coded slices). To generate a coded slice, video encoder 20 may encode a series of CTUs. This disclosure may refer to an encoded representation of a CTU as a coded CTU. In some examples, each of the slices includes an integer number of coded CTUs.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. In a monochrome picture or a picture that has three separate color planes, a CU may comprise a single coding block and syntax structures used to code the samples of the coding block.

Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples. Video encoder 20 may generate a predictive block for each prediction block of a PU. For example, video encoder 20 may generate predictive luma, Cb and Cr blocks for luma, Cb and Cr prediction blocks of each PU of the CU. Predictive blocks may also be referred to as predictive sample blocks.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector. When video encoder 20 uses uni-prediction to generate the predictive blocks for a PU, the PU may have two motion vectors.

After video encoder 20 generates predictive blocks (e.g., predictive luma, Cb and Cr blocks) for one or more PUs of a CU, video encoder 20 may generate one or more residual blocks for the CU. Each sample in a residual block for the CU may indicate a difference between a sample in a predictive block of a PU of the CU and a corresponding sample in a coding block of the CU. For example, video encoder 20 may generate a luma residual block for the CU. Each sample in a luma residual block of a CU may indicate a difference between a luma sample in a predictive luma block of a PU of the CU and a corresponding sample in an original luma coding block of the CU. In addition, video encoder 20 may generate a Cb residual block for the CU. Each sample in a Cb residual block of a CU may indicate a difference between a Cb sample in one of a predictive Cb block of a PU of the CU and a corresponding sample in an original Cb coding block of the CU. Video encoder 20 may also generate a Cr residual block for the CU. Each sample in a Cr residual block of the CU may indicate a difference between a Cr sample in a predictive Cr block of a PU of the CU and a corresponding sample in an original Cr coding block of the CU.

Furthermore, video encoder 20 may use quad-tree partitioning to decompose the residual blocks (e.g., luma, Cb and Cr residual blocks) of a CU into one or more transform blocks (e.g., luma, Cb and Cr transform blocks). A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. In a monochrome picture or a picture that have three separate color planes, a TU may comprise a single transform block and syntax structures used to transform the transform block samples. The luma transform block of (i.e., associated with) a TU of a CU may be a sub-block of a luma residual block of the CU. The Cb transform block of a TU of a CU may be a sub-block of a Cb residual block of the CU. The Cr transform block of a TU of a CU may be a sub-block of a Cr residual block of the CU.

For 3D coding, depth values in depth blocks may likewise be represented as sample values (e.g., luma values), each indicating a level of depth associated with a given pixel location. One or more of the techniques of this disclosure are applicable to the coding of depth blocks, particularly in modes such as skip mode or merge mode where a list of candidates is generated for inheriting or using motion information of a selected candidate, in coding the depth block.

Video encoder 20 may apply one or more transforms to a transform block of a TU to generate a coefficient block for the TU. A coefficient block may be a two-dimensional array of transform coefficients. A transform coefficient may be a scalar quantity. For example, video encoder 20 may apply one or more transforms to a luma transform block of a TU to generate a luma coefficient block for the TU. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream. The bitstream may also include syntax elements that are not entropy encoded.

Video decoder 30 may receive a bitstream generated by video encoder 20. In addition, video decoder 30 may parse the bitstream to obtain (e.g., decode) syntax elements from the bitstream. Video decoder 30 may reconstruct the pictures of the video data based at least in part on the syntax elements decoded (or otherwise obtained) from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. In some examples, video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some cases, video encoder 20 may signal the motion information of a PU using merge mode or skip mode, or possibly an advanced motion vector prediction (AMVP) mode. In other words, in the HEVC standard, there are two inter prediction modes for a PU, named merge (skip is considered as a special case of merge) mode and AMVP mode, respectively. In either merge mode or AMVP mode, a video coder maintains a motion vector candidate list for multiple motion vector predictors. For ease of explanation, this disclosure may refer to a motion vector candidate list for the merge mode as a "merge candidate list" or a "merging candidate list." Similarly, this disclosure may refer to a motion vector candidate list for AMVP mode as an AMVP candidate list. The motion information of a PU may include motion vector(s) of the PU and reference index(es) of the PU.

When video encoder 20 signals the motion information of a current PU using merge mode, video encoder 20 generates a merge candidate list. The merge candidate list includes a set of candidates. Candidates in a merge candidate list may be referred to as "merge candidates" or "merging candidates." The candidates may indicate the motion information of PUs that spatially or temporally neighbor the current PU. PUs that spatially neighbor the current PU may have predictive blocks adjacent to a predictive block of the current PU in the same picture as the current PU. PUs that temporally neighbor the current PU may be in a different picture than the current PU. Video encoder 20 may then select a candidate from the candidate list and may use the motion information indicated by the selected candidate as the motion information of the current PU. Furthermore, in merge mode, video encoder 20 may signal the position in the candidate list of the selected candidate. For instance, video encoder 20 may signal a merge index (e.g., merge_idx) that indicates a position in the merging candidate list of the selected merging candidate. Video decoder 30 may generate the same candidate list and may determine, based on the indication of the position of the selected candidate (e.g., the position indicated by the merge index), the selected candidate. Video decoder 30 may then use the motion information of the selected candidate to generate one or more predictive blocks (e.g., predictive samples) for the current PU. Video decoder 30 may reconstruct samples based on the predictive blocks (e.g., predictive samples) for the current PU and a residual signal. In this way, a video coder may generate motion vector(s), as well as reference indices in the merge mode, of the current PU by taking one candidate from the motion vector candidate list.

Skip mode is similar to merge mode in that video encoder 20 generates a candidate list and selects a candidate from the list of candidates. However, when video encoder 20 signals the motion information of a current PU (e.g. a depth block) using skip mode, video encoder 20 may avoid generation of any residual signal. Because skip mode has the same motion vector derivation process as merge mode, techniques described in this document may apply to both merge and skip modes. One or more aspects of this disclosure may also be used for AMVP mode or other modes that make use of candidate lists.

AMVP mode is similar to merge mode in that video encoder 20 generates a candidate list and selects a candidate from the list of candidates. However, when video encoder 20 signals the motion information of a current PU (e.g. a depth block) using AMVP mode, video encoder 20 may signal a motion vector difference (MVD) for the current PU and a reference index in addition to signaling a position of the selected candidate in the candidate list. An MVD for the current PU may indicate a difference between a motion vector of the current PU and a motion vector of the selected motion vector candidate. In uni-prediction, video encoder 20 may signal one MVD and one reference indices for the current PU. In bi-prediction, video encoder 20 may signal two MVDs and two reference indices for the current PU. In some examples, video encoder 20 may typically signal one MVD and one reference indices for the current PU, although depth block prediction could also use techniques similar to bi-prediction where two MVDs and two reference indices are signaled.

Furthermore, when the motion information of a current PU is signaled using AMVP mode, video decoder 30 may generate the same candidate list and may determine, based on the indication of the position of the selected candidate, the selected candidate. Video decoder 30 may recover a motion vector of the current PU by adding a MVD to the motion vector of the selected candidate. Video decoder 30 may then use the recovered motion vector or motion vectors of the current PU to generate predictive blocks for the current PU.

In some examples, the motion vector candidate list contains up to five candidates for the merge mode and only two candidates for the AMVP mode. In other words, a merge candidate list may include up to five candidates while an AMVP candidate list may only include two candidates. A merge candidate (i.e., a candidate in a motion vector candidate list for merge mode) may contain motion vectors corresponding to both reference picture lists (list 0 and list 1) and the reference indices. If a merge candidate is identified by a merge index, the reference pictures used for the prediction of the current blocks, as well as the associated motion vectors are determined. However, under AMVP mode for each potential prediction direction from either list 0 or list 1, a reference index is explicitly signaled, together with a motion vector predictor index to the motion vector candidate list since the AMVP candidate contains only a motion vector. In AMVP mode, the predicted motion vectors can be further refined.

As indicated above, a video coder may derive candidates for the merge mode from spatial and temporal neighboring blocks. The video coder may derive the maximum number of candidates from the coded syntax element five_minus_max_num_merge_cand, which is included in a slice header for a slice. The syntax element five_minus_max_num_merge_cand specifies the maximum number of merging candidates supported in the slice, subtracted from 5. The video coder may derive the maximum number of merging candidates, MaxNumMergeCand as follows:

$$\text{MaxNumMergeCand}=5-\text{five\_minus\_max\_num\_merge\_cand} \quad (7\text{-}39)$$

The value of MaxNumMergeCand is in the range of 1 to 5, inclusive.

Figure 2:
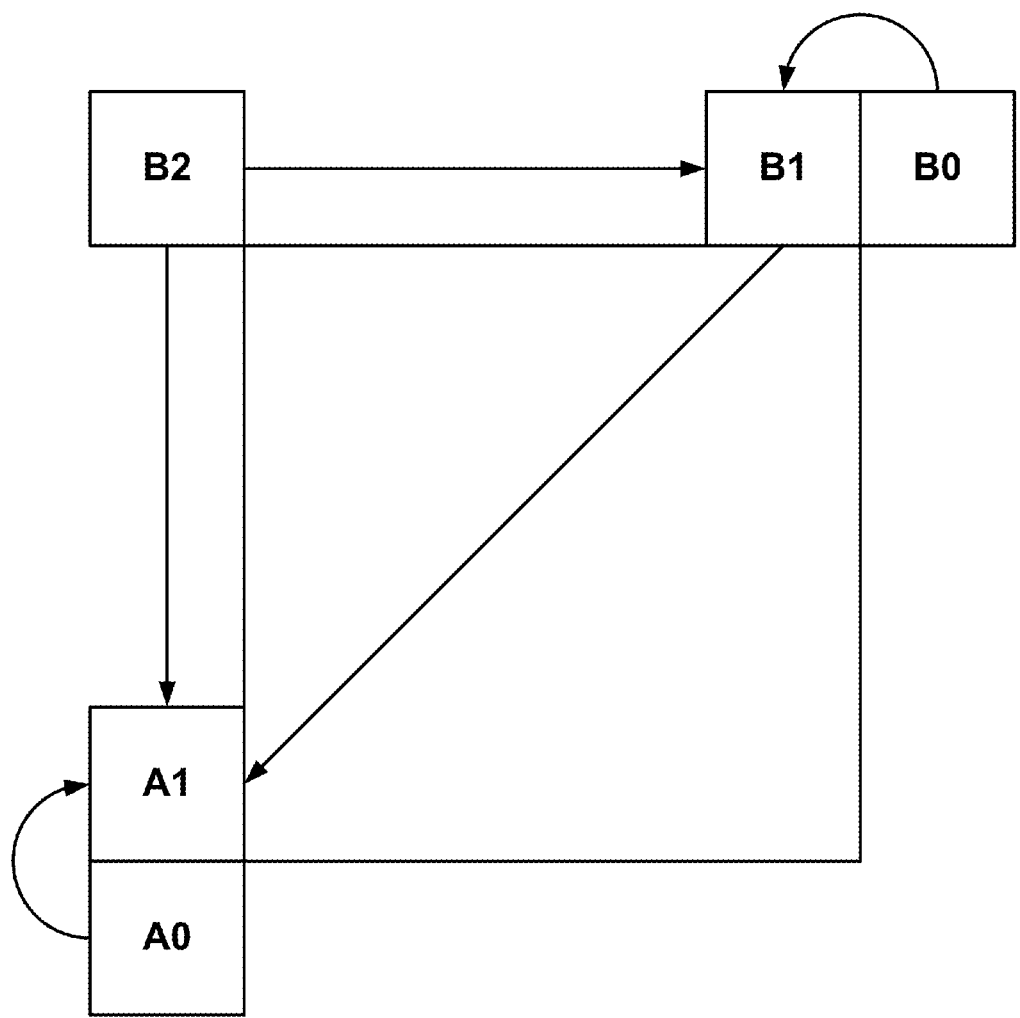
FIG. 2 is a conceptual illustration showing spatial neighbors which are the potential candidates for a merge list.

A video coder may construct the merge candidate list with the following steps. First, the video coder may derive up to four spatial motion vector candidates from five spatial neighboring blocks shown in FIG. 1. FIG. 2 is a conceptual illustration showing spatial neighbors which are the potential candidates for the merge list. Arrows indicate which spatial candidate(s) are to be compared. The video coder may derive the spatial motion vector candidates in the following order: left (A1), above (B1), above right (B0), below left (A0), and above left (B2), as shown in FIG. 2. Furthermore, the video coder may apply a pruning process to remove identical spatial motion vector candidates. For example, the video coder may compare B1 to A1, compare B0 to B1, compare A0 to A1 and compare B2 to both B1 and A1. If there are already four merge candidates available after the pruning process, the video coder does not insert B2 into the merge candidate list.

Second, the video coder may determine temporal merging candidates. For instance, the video coder may add a temporal motion vector predictor (TMVP) candidate from a co-located reference picture (if enabled and available) into the merge candidate list (i.e., the motion vector candidate list) after spatial motion vector candidates.

Third, if the merge candidate list (i.e., motion vector candidate list) is not complete, the video coder may generate and insert artificial motion vector candidates at the end of the merge candidate list until the merge candidate list has all candidates (i.e., all candidates indicated by MaxNumMergeCand). In other words, the video coder may insert artificial motion vector candidate into the merge candidate list if the number of merge candidate in the merge candidate list is less than MaxNumMergeCand. There are two types of artificial motion vector candidates: combined bi-predictive merging candidates (which are derived only for B-slices) and zero motion vector merging candidates. The merging candidate list may include one or more zero motion vector merging candidates if the first type (i.e., combined bi-predictive merging candidates) does not provide enough artificial candidates.

When a current slice (i.e., a slice that a video coder is currently coding) is a B slice, the video coder may invoke a derivation process for combined bi-predictive merging candidates. In at least some examples, a B slice is a slice in which intra prediction, uni-directional inter prediction, and bi-directional inter prediction are allowed. When the derivation process is invoked, the video coder may, for each pair of merge candidates that are already in the merge candidate list and have the necessary motion information, derive combined bi-predictive motion vector candidates (with index denoted by combIdx) by a combination of the motion vector (and, in some instances, reference index) of the first merge candidate of the pair (with merge candidate index equal to l0CandIdx) referring to a picture in the list 0 (if available) and the motion vector (and, in some instances, reference index) of a second merge candidate of the pair (with merge candidate index equal to l1CandIdx) referring to a picture in the list 1 (if available and either reference picture or motion vector is different from the first candidate). The pair of merge candidate may be an ordered pair in the sense that different orders of the same two merge candidates are considered different pairs. The definitions of l0CandIdx and l1CandIdx corresponding to combIdx are illustrated in Table 1, below.

TABLE 1

Specification of l0CandIdx and l1CandIdx

| combIdx | 0 | 1 | 2 | 3 | 4 | 5 | 6 | 7 | 8 | 9 | 10 | 11 |
|---|---|---|---|---|---|---|---|---|---|---|---|---|
| l0CandIdx | 0 | 1 | 0 | 2 | 1 | 2 | 0 | 3 | 1 | 3 | 2 | 3 |
| l1CandIdx | 1 | 0 | 2 | 0 | 2 | 1 | 3 | 0 | 3 | 1 | 3 | 2 |

In Table 1, the row for l0CandIdx indicates indices of merge candidates from which to draw RefPicList0 motion information (e.g., motion vectors, reference indices). Similarly, in Table 1, the row for l1CandIdx indicates indices of merge candidates from which to draw RefPicList1 motion information. Thus, the column for combination 0 (i.e., combIdx=0) indicates that a combined bi-predictive motion vector candidate specifies the RefPicList0 motion information of merge candidate 0 and specifies the RefPicList1 motion information of merge candidate 1. Because not all merge candidates necessarily have the applicable motion information for a combination (e.g., merge candidate 1 may not have RefPicList1 motion information) or the motion information of RefPicList0 associated with merge candidate 0 and RefPicList1 associated with merge candidate 1 are identical, a video coder may process the combinations of Table 1 in order of combIdx until there are no remaining combinations available or the video coder has generated a sufficient number of combined bi-predictive motion vector candidates.

For combIdx being 0 . . . 11, the generation process of combined bi-predictive motion vector candidates is terminated when one the following conditions is true:
 combIdx is equal to (numOrigMergeCand*(numOrigMergeCand−1)) wherein numOrigMergeCand denotes the number of candidates in the merge list before invoking this process.
 Number of total candidates (including newly generated combined bi-predictive merging candidates) in the merge list is equal to MaxNumMergeCand.

As indicated above, a video encoder may include one or more zero motion vector merging candidates in a merging candidate list. For each respective zero motion vector merging candidate, a motion vector of the respective zero motion vector merging candidate is set to 0 and a reference index for the respective zero motion vector merging candidate is set from 0 to the number of available reference indexes minus 1. If the number of merge candidates in the merge candidate list is still less than MaxNumMergeCand, the video coder may insert one or more zero motion vector candidates (e.g., zero reference indices and motion vectors) until the total number of merge candidates in the merge candidate list is equal to MaxNumMergeCand.

The following sub-sections of this disclosure review AVC-based and HEVC-based 3D video coding techniques related to this disclosure. In multi-view coding (e.g., 3D video coding), there may be multiple views of the same scene from different viewpoints. The term "access unit" may be used to refer to the set of pictures that correspond to the same time instance. In other words, an access unit may include coded pictures of all of the views for one output time instance. A "view component" may be a coded representation of a view in a single access unit. In some examples, a view component may contain a texture view component and a depth view component. In this disclosure, a "view" may refer to a sequence of view components associated with the same view identifier. Thus, when a view includes both coded texture and depth representations, a view component may comprise (e.g., consist of) a texture view component and a depth view component. In some examples, a texture view component is a coded representation of the texture of a view in a single access unit. Furthermore, in some examples, a depth view component is a coded representation of the depth of a view in a single access unit. A depth view component may also be referred to as a depth picture.

Each texture view component includes actual image content to be displayed. For example, a texture view component may include luma (Y) and chroma (Cb and Cr) components. Each depth view component may indicate relative depths of the pixels in its corresponding texture view component. In some examples, depth view components are gray scale images that include only luma values. In other words, depth view components may not convey any image content, but rather may provide measures of the relative depths of the pixels in corresponding texture view components.

For example, a purely white pixel in a depth view component may indicate that the pixel's corresponding pixel or pixels in the corresponding texture view component are closer, from the perspective of the viewer. In this example, a purely black pixel in the depth view component indicates that the pixel's corresponding pixel or pixels in the corresponding texture view component are further away, from the perspective of the viewer. The various shades of gray in between black and white indicate different depth levels. For instance, a dark gray pixel in a depth view component indicates that the pixel's corresponding pixel in the texture view component is further away than a light gray pixel in the depth view component. In this example, because only gray scale is needed to identify the depth of pixels, depth view components do not need to include chroma components, as the chroma components for the depth view components may not serve any purpose. This disclosure provides the example of depth view components using only luma values (e.g., intensity values) to identify depth for illustration purposes and should not be considered limiting. In other examples, other techniques may be utilized to indicate relative depths of the pixels in texture view components.

In multi-view coding, a bitstream may have a plurality of layers. Each of the layers may correspond to a different view. In multi-view coding, a view may be referred to as a "base view" if a video decoder (e.g., video decoder 30) can decode pictures in the view without reference to pictures in any other view. A view may be referred to as a non-base view if decoding of the view is dependent on decoding of pictures in one or more other views. When coding a picture in one of the non-base views, a video coder (such as video encoder 20 or video decoder 30) may add a picture into a reference picture list if the picture is in a different view but within a same time instance (i.e., access unit) as the picture that the video coder is currently coding. Like other inter prediction reference pictures, the video coder may insert an inter-view prediction reference picture at any position of a reference picture list.

In 3D-HEVC, a disparity vector (DV) may be used as an estimator of the displacement between two views. Because neighboring blocks share almost the same motion/disparity information in video coding, the current block can use the motion vector information in neighboring blocks as a good predictor. Following this idea, the neighboring block based disparity vector derivation (NBDV) process uses the neighboring motion vector information for estimating the disparity vector in different views. 3D-HEVC firstly adopted the Neighboring Block (based) Disparity Vector (NBDV) method proposed in the following document: Zhang et al., "3D-CE5.h: Disparity vector generation results," Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012, document JCT3V-A0097 (hereinafter, "JCT3V-A0097").

Several spatial and temporal neighboring blocks are defined in the NBDV process. A video coder performing the NBDV process may check each of the spatial and temporal neighboring blocks in a pre-defined order determined by the priority of the correlation between a current block and the candidate block (i.e., spatial or temporal neighboring block). Thus, in the NBDV process, the video coder utilizes two sets of neighboring blocks. One set of neighboring blocks is from spatial neighboring blocks and the other set is from temporal neighboring blocks. When the video coder checks a neighboring block, the video coder may determine whether the neighboring block has a disparity motion vector (i.e., the motion vector points to an inter-view reference picture). Once the video coder finds a disparity motion vector, the video coder may convert the disparity motion vector to a disparity vector. For example, to convert the disparity motion vector to the disparity vector, the video coder may set the disparity vector equal to the disparity motion vector. Meanwhile, the associated reference view order index is also returned. In other words, as part of performing the NBDV process, the video coder may also determine a reference view order index.

In some versions of 3D-HEVC, the video coder uses two spatial neighboring blocks in the NBDV process for the disparity vector derivation. The two spatial neighboring blocks are the left and above of current CU, as denoted by A1, B1 as shown in FIG. 3. FIG. 3 is a conceptual diagram illustrating spatial and temporal neighboring blocks relative to the current coding unit. It should be noted that the spatial neighboring blocks used in the NBDV process are the same as those used in the merge mode in HEVC. Therefore, at least in some examples, no additional memory access is required when processing the spatial neighboring blocks in the NBDV process.

In some examples, to check temporal neighboring blocks in the NBDV process, the video coder may first perform a construction process to generate a candidate picture list. Up to two reference pictures from the current view (i.e., the view that includes the picture currently being coded) may be treated as candidate pictures. A co-located reference picture (i.e., a co-located picture) is first inserted to the candidate picture list, followed by the rest of the candidate pictures (i.e., all of the reference pictures in RefPicList0 and RefPicList1) in the ascending order of reference index.

If the current slice of the current picture is a B slice (i.e., a slice that is allowed to include bi-directionally inter predicted PUs), video encoder 20 may signal, in a slice header, a syntax element (e.g., collocated_from_l0_flag) that indicates whether the co-located picture is from RefPicList0 or RefPicList1. In other words, when the use of TMVPs is enabled for a current slice, and the current slice is a B slice (e.g., a slice that is allowed to include bi-directionally inter predicted PUs), video encoder 20 may signal a syntax element (e.g., collocated_from_l0_flag) in a slice header to indicate whether the co-located picture is in RefPicList0 or RefPicList1. If the current slice is not a B slice, it may be unnecessary for video encoder 20 to signal the syntax element to indicate whether the co-located picture is in RefPicList0 or RefPicList1 because if the current slice is an I slice, not inter prediction is allowed, and if the current slice is a P slice, there is only one reference picture list for the slice. After video decoder 30 identifies the reference picture list that includes the co-located picture, video decoder 30 may use another syntax element (e.g., collocated_ref_idx), which may be signaled in a slice header, to identify a picture (i.e., the co-located picture) in the identified reference picture list. That is, after a reference picture list is identified, collocated_ref_idx, which is signaled in a slice header, may be used to identify the picture in the reference picture list.

When two reference pictures with the same reference index in both reference picture lists are available, the reference picture in the same reference picture list of the co-located picture precedes the other reference picture. For each candidate picture in the candidate picture list, the video coder may determine the block of the co-located region covering the center position as the temporal neighboring block.

When a block is coded with inter-view motion prediction, the video coder may need to derive a disparity vector for selecting a corresponding block in a different view. An implicit disparity vector (IDV or a.k.a. derived disparity vector) may be referred to as a disparity vector derived in the inter-view motion prediction. Even though the block is coded with motion prediction, the derived disparity vector is not discarded for the purpose of coding a following block.

In at least some designs of the 3D-HTM, the NBDV process checks disparity motion vectors in the temporal neighboring blocks, disparity motion vectors in the spatial neighboring blocks, and then the IDVs in order. Once the video coder finds a disparity motion vector or IDV, the video coder terminates the NBDV process.

In some examples, when a video coder derives a disparity vector from the NBDV process, the video coder further refines the disparity vector by retrieving depth data from a depth map (i.e., a depth view component) of the reference view. The refinement process is named depth-oriented NBDV (DoNBDV) and may include the following two steps. First, locate a corresponding depth block by the derived disparity vector in the previously coded reference depth view, such as the base view; the size of the corresponding depth block is the same as that of the current PU. Second, select one depth value from four corner pixels of the corresponding depth block (due to the adoption of Chang et al., "3D-CE2.h related: Simplified DV derivation for DoNBDV and BVSP," Joint Collaborative Team on 3D Video Coding Extensions of ITU-T SG 16 WP 3 and ISO/IEC JTC 1/SC 29/WG 11, 4$^{th}$ Meeting, Incheon, KR 20-26 Apr. 2013, document no. JCT3V-D0138 (hereinafter, "JCT3V-D0138")) and convert the selected depth value to the horizontal component of the refined disparity vector. The vertical component of the disparity vector is unchanged. JCT3V-D0138 is available at http://phenix.it-sudparis.eu/jct3v/doc_end_user/current_document.php?id=823.

In 3D-HEVC, the construction process for merge candidate lists differs from the construction process for merge candidate lists used in HEVC. For instance, based on the derived disparity vector from the NBDV process or DoNBDV, the video coder may add a new motion vector candidate (i.e., an Inter-view Predicted Motion Vector Candidate (IPMVC)), if available, to AMVP and skip/merge modes. In other words, the video coder may include an IPMVC in a merge candidate list or an AMVP candidate list. The IPMVC may specify the motion information of a reference block in a reference view. For instance, an IPMVC may specify one or more temporal motion vectors, as well as prediction direction indicators and reference indices.

For the merge/skip mode, the video coder may derive an inter-view predicted motion vector by the following steps. First, the video coder may locate a corresponding block of current PU/CU in a reference view of the same access unit by the disparity vector. Second, if the corresponding block is not intra-coded and not inter-view predicted and its reference picture has a picture order count (POC) value equal to that of one entry in the same reference picture list of the current PU/CU, the video coder may derive its motion information (prediction direction, reference pictures, and motion vectors), after converting the reference index based on POC, to be the inter-view predicted motion vector.

Figure 4:
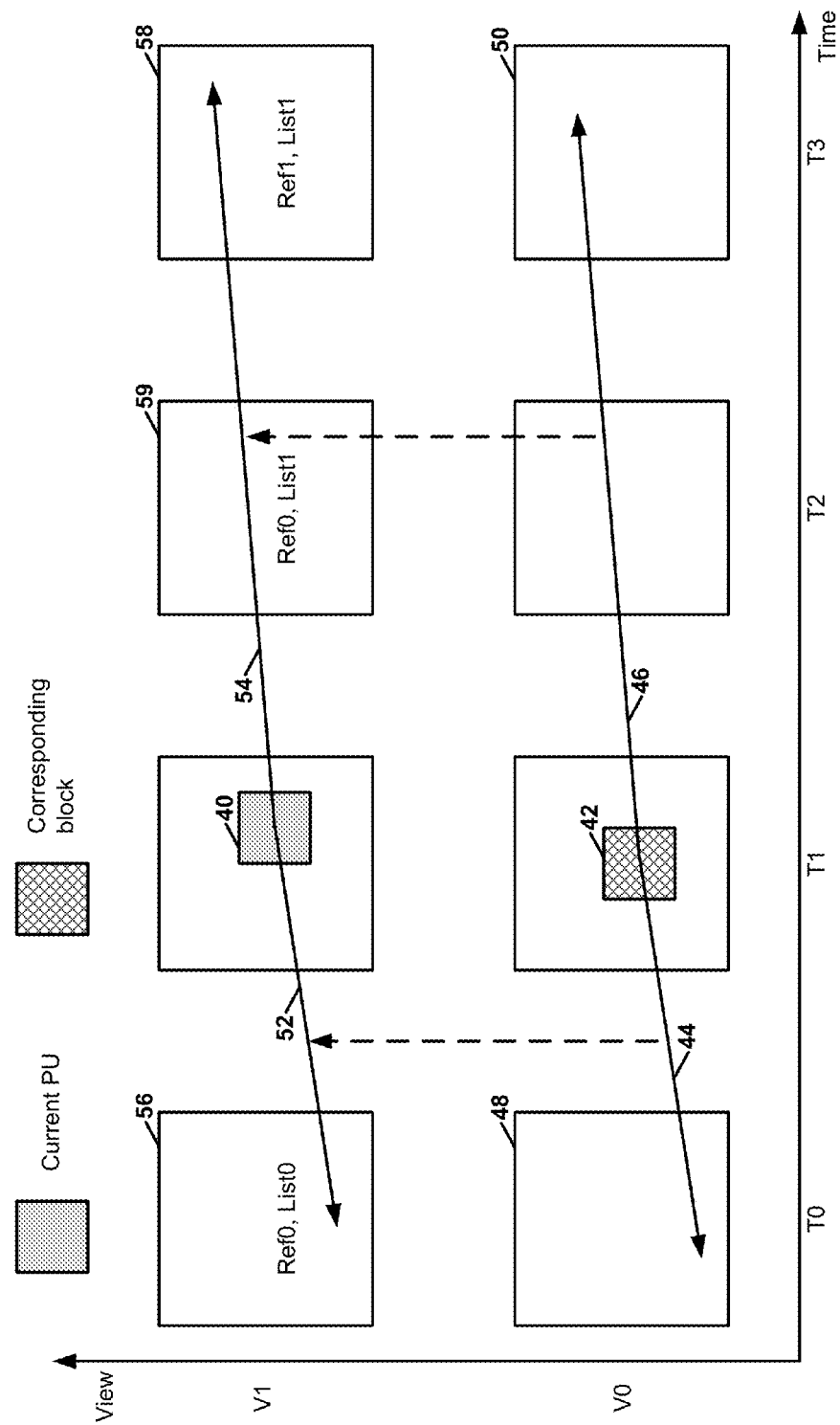
FIG. 4 shows an example of a derivation process of an inter-view predicted motion vector candidate.

FIG. 4 shows an example of the derivation process of the inter-view predicted motion vector candidate. In particular, FIG. 4 is a conceptual illustration showing derivation of an inter-view predicted motion vector candidate for merge/skip mode. In the example of FIG. 4, a current PU 40 occurs in view V1 at a time instance T1. A reference PU 42 for current PU 40 occurs in a different view than current PU 40 (i.e., view V0) and at the same time instance as current PU 40 (i.e., time instance T1). In the example of FIG. 4, reference PU 42 is bi-directionally inter predicted. Hence, reference PU 42 has a first motion vector 44 and a second motion vector 46. Motion vector 44 indicates a position in a reference picture 48. Reference picture 48 occurs in view V0 and in time instance T0. Motion vector 46 indicates a position in reference picture 50. Reference picture 50 occurs in view V0 and in time instance T3.

The video coder may generate, based on the motion information of reference PU 42, an IPMVC for inclusion in a merge candidate list of current PU 40. The IPMVC may have a first motion vector 52 and a second motion vector 54. Motion vector 52 matches motion vector 44 and motion vector 54 matches motion vector 46. The video coder generates the IPMVC such that a first reference index of the IPMVC indicates a position in RefPicList0 for current PU 40 of a reference picture (i.e., reference picture 56) occurring in the same time instance as reference picture 48 (i.e., time instance T0). In the example of FIG. 4, reference picture 56 occurs in the first position (i.e., Ref0) in RefPicList0 for current PU 40. Furthermore, the video coder generates the IPMVC such that a second reference index of the IPMVC indicates a position in RefPicList1 for current PU 40 of a reference picture (i.e., reference picture 58) occurring in the same time instance as reference picture 50. Thus, in the example of FIG. 4, the RefPicList0 reference index of the IPMVC may be equal to 0. In the example of FIG. 4, a reference picture 59 occurs in the first position (i.e., Ref0) in RefPicList1 for current PU 40 and reference picture 58 occurs in the second position (i.e., Ref1) in RefPicList1 for current PU 40. Accordingly, the RefPicList1 reference index of the IPMVC may be equal to 1.

Thus, In the example of FIG. 4, a disparity vector is calculated by finding corresponding block 42 in a different view (e.g., view 0 or V0) to current PU 40 in the currently coded view (view 1 or V1). If corresponding block 42 is not intra-coded and not inter-view predicted, and its reference picture has a POC value that is in the reference picture list of current PU 40 (e.g., Ref0, List 0; Ref0, List1; Ref1, List 1, as shown in FIG. 4), then the motion information for corresponding block 42 is used as an inter-view predicted motion vector. The video coder may scale the reference index based on the POC.

Furthermore, when generating a merging candidate list (or in some examples, AMVP candidate list) for a block (e.g., PU), the video coder may convert a disparity vector of the block into an inter-view disparity motion vector candidate (IDMVC). The IDMVC may specify the disparity vector of the block. The video coder may add the IDMVC into the merge candidate list (or in some examples, AMVP candidate list) in a different position from IPMVC. Alternatively, in some examples, the video coder may add the IDMVC into the merge candidate list (or in some examples, AMVP candidate list) in the same position as the IPMVC, when the IDMVC is available. In this context, either an IPMVC or an IDMVC may be called an "inter-view candidate." In some examples, in the merge/skip mode, the video coder always inserts the IPMVC, if available, before all spatial and temporal merging candidates to the merge candidate list. In some such examples, the video coder may insert the IDMVC before the spatial merging candidate derived from $A_0$.

Thirumalai et al., "Merge candidates derivation from vector shifting," Joint Collaborative Team on 3D Video Coding Extensions of ITU-T SG 16 WP 3 and ISO/IEC JTC 1/SC 29/WG 11, 5$^{th}$ Meeting, Vienna, AU, Jul. 27-Aug. 2, 2013, document no. JCT3V-E0126 (hereinafter, "JCT3V-E0126") describes merge candidate derivation from vector shifting. JCT3V-E0126 is available at http://phenix.it-sudparis.eu/jct3v/doc_end_user/current_document.php?id=1140. Due to the adoption of JCT3V-E0126, one more candidate, named a "shifted candidate" or "shifted IvMVC," may be derived with a shifted disparity vector. Such a candidate could be an IPMVC derived from a reference block in a reference view with shifted disparity vectors or derived from the first available spatial merging candidate including a disparity motion vector or IDMVC. Detailed steps for generating the additional candidate and insertion to the merge candidate list are described as follows.

First, a video coder shifts the disparity vector DV by ((PuWidth/2*4+4), (PuHeight/2*4+4)). The video coder uses the DV to derive a shifted IvMC candidate from the reference view. Here, the size of the current PU is PuWidth× PuHeight. If the shifted IvMVC is available, the video coder may skip step 2 (i.e., the second step described below) and if this shifted IvMC is not identical to the IvMC without disparity vector shifting, the video coder inserts the shifted IvMC into the merge candidate list just before the temporal merging candidate.

Second, the video coder may derive a candidate, denoted as Disparity Shifted Motion Vector (DSMV). The video coder may set the DSMV to be the additional candidate. If the DSMV is available, the video coder may directly insert the DSMV into the merge candidate list in the same position as a shifted IvMC. The video coder may derive the DSMV as follows. First, the video coder identifies the first available disparity motion vector (DMV) corresponding to the Ref- PicList0 from the spatial neighboring blocks. Second, if the DMV is available, the video coder sets the horizontal component of the motion vector in List 0 to DMV shifted by 4 and the video coder keeps the vertical component of the motion vector unchanged or resets the vertical component of the motion vector to 0, depending on whether or not BVSP is enabled. The reference indices and motion vectors in List 1 are directly inherited. Otherwise (i.e., if the DMV is not available), the video coder sets the horizontal component of the motion vector in List 0 and List 1 to the DV shifted by 4 and the video coder sets both vertical components of motion vectors in List 0 and List 1 to 0.

Tian et al., "CE1.h: Backward View Synthesis Prediction using Neighbouring Blocks," Joint Collaborative Team on 3D Video Coding Extension Development of ITU-T SG 16 WP 3 and ISO/IEC JCT 1/SC 29/WG 11, $3^{rd}$ Meeting, Geneva, CH, 17-23 Jan. 2013, document no. JCT3V-00152 (hereinafter, "JCT3V-00152") describes backward view synthesis prediction using neighboring blocks. JCT3V-00152 is available at: http://phenix.it-sudparis.eu/jct2/doc_end_user/current_document.php?id=594. The backward-warping VSP approach as proposed in JCT3V-00152 was adopted in the third JCT-3V meeting. The basic idea of this backward-warping VSP as proposed in JCT3V-00152 is the same as the block-based VSP in 3D-AVC. Both of these two techniques use the backward-warping and block-based VSP to avoid transmitting the motion vector differences and use more precise motion vectors. Implementation details are different due to different platforms. The following paragraphs use the term "BVSP" to indicate the backward-warping VSP approach in 3D-HEVC.

In some designs of the 3D-HTM, the BVSP mode is only supported for an inter-code block in either skip or merge mode. BVSP mode is not allowed for a block coded in AMVP mode. Instead of transmitting a flag to indicate the usage of BVSP mode, one additional merging candidate (i.e., BVSP merging candidate) is introduced and each candidate is associated with one BVSP flag. As indicated above, video encoder 20 may signal a merge index (e.g., merge_idx) in a bitstream and video decoder 30 may obtain the merge index from the bitstream. When the decoded merge index corresponds to a BVSP merging candidate, the current PU uses the BVSP mode. Furthermore, when the decoded merge index corresponds to the BVSP merging candidate, for each sub-block within the current PU, the video coder may derive a disparity motion vector for the sub-block by converting a depth value in a depth reference view.

The setting of BVSP flags may be defined as follows. When a spatial neighboring block used for deriving a spatial merging candidate is coded with BVSP mode, the associated motion information is inherited by the current block as in conventional merging mode. In addition, this spatial merging candidate is tagged with a BVSP flag equal to 1. For the newly introduced BVSP merging candidate, the BVSP flag is set to 1. For all the other merging candidates, the associated BVSP flags are set to 0.

As indicated above, in 3D-HEVC, a video coder may derive a new candidate (i.e., a BVSP merging candidate) and may insert the BVSP merging candidate into the merge candidate list. The video coder may set the corresponding reference indices and motion vectors for the BVSP merging candidate by the following method. First, the video coder may obtain the view index (denoted by refVIdxLX) of the derived disparity vector from NBDV. Second, the video coder may obtain the reference picture list RefPicListX (either RefPicList0 or RefPicList1) that is associated with the reference picture with the view order index equal to refVIdxLX. The video coder may use the corresponding reference index and the disparity vector from the NBDV process as the motion information of the BVSP merging candidate in RefPicListX.

Third, if the current slice is a B slice, the video coder may check the availability of an inter-view reference picture with a view order index (denoted by refVIdxLY) unequal to refVIdxLX in the reference picture list other than RefPicListX, (i.e., RefPicListY with Y being 1-X). If such a different inter-view reference picture is found, the video coder applies bi-predictive VSP. Meanwhile, the video coder uses the corresponding reference index of the different inter-view reference picture and the scaled disparity vector from a NBDV process as the motion information of the BVSP merging candidate in RefPicListY. The video coder may use the depth block from the view with view order index equal to refVIdxLX as the current block's depth information (in the case of texture-first coding order), and the video coder may access the two different inter-view reference pictures (each from one reference picture list) via a backward warping process and further weighted to achieve the final backward VSP predictor. Otherwise, the video coder applies uni-predictive VSP with RefPicListX as the reference picture list for prediction.

In the 3D-HTM, texture first coding is applied in common test conditions. Therefore, the corresponding non-base depth view is unavailable when decoding one non-base texture view. Therefore, the depth information is estimated and used to perform BVSP. In order to estimate the depth information for a block, a video coder may first derive a disparity vector from the neighboring blocks, and then use the derived disparity vector to obtain a depth block from a reference view. In the 3D-HTM 8.0 test model, there exists a process to derive a disparity vector predictor, known as a NBDV (Neighboring Block Disparity Vector). Let $(dv_x, dv_y)$ denote the disparity vector identified from the NBDV function, and the current block position is $(block_x, block_y)$.

Figure 5:
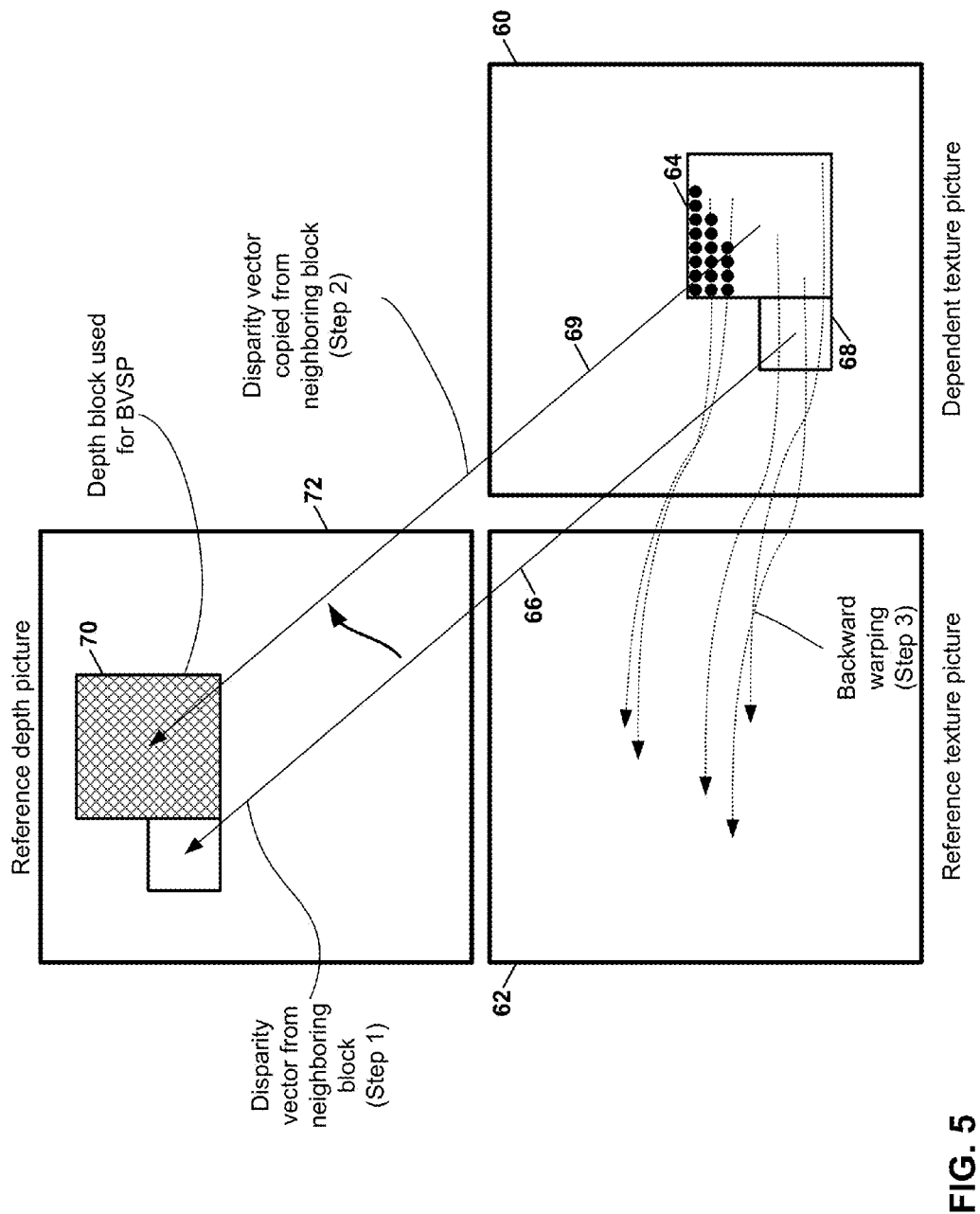
FIG. 5 is a conceptual diagram illustrating depth block derivation from a reference view to perform backward-warping view synthesis prediction (BVSP).

In some examples of uni-predictive BVSP, a video coder fetches a depth block with the top-left position $(block_x+dv_x, block_y+dv_y)$ in the depth image of the reference view. The current block is firstly split into several sub-blocks, each having the same size of W*H. For each sub-block with the size equal to W*H, the video coder uses a corresponding depth sub-block within the fetched depth block and converts the maximum depth value from the four corner pixels of the depth sub-block to a disparity motion vector. The video coder then uses the derived disparity motion vector for each sub-block for motion compensation. FIG. 5 illustrates the three steps of how a depth block from the reference view is located and then used for BVSP (also called "BVSP prediction").

In particular, FIG. 5 is a conceptual diagram illustrating depth block derivation from a reference view to perform BVSP prediction. In some examples of bi-prediction BVSP, when there are multiple inter-view reference pictures from different views in RefPicList0 and RefPicList1, the video coder applies bi-predictive VSP. That is, the video coder may generate two VSP predictors from each reference list, as described above. The video coder may then average the two VSP predictors to obtain the final VSP predictor.

In the example of FIG. 5, a video coder is coding a current texture picture 60. Current texture picture 60 is labeled a "dependent texture picture" because current texture picture 60 is dependent on a synthesized reference texture picture 62. In other words, the video coder may need to synthesize reference texture picture 62 (or portions thereof) in order to decode current texture picture 60. Reference texture picture 62 and current texture picture 60 are in the same access unit but are in different views.

In order to synthesize reference texture picture 62 (or portions thereof), the video coder may process blocks (i.e., video units) of current texture picture 60. In the example of FIG. 5, the video coder is processing a current block 64. When the video coder processes current block 64, the video coder may perform the NBDV derivation process to derive a disparity vector for current block 64. For instance, in the example of FIG. 5, the video coder identifies a disparity vector 66 of a block 68 that neighbors current block 64. The identification of disparity vector 66 is shown as Step 1 of FIG. 5. Furthermore, in the example of FIG. 5, the video coder determines, based on disparity vector 66, a disparity vector 69 of current block 64. For instance, disparity vector 69 may be a copy of disparity vector 66. Copying disparity vector 66 is shown as Step 2 of FIG. 5.

The video coder may identify, based on disparity vector 69 of current block 64, a reference block 70 in a reference depth picture 72. Reference depth picture 72, current texture picture 60, and reference texture picture 62 may each be in the same access unit. Reference depth picture 72 and reference texture picture 62 may be in the same view. The video coder may determine, based on texture sample values of current block 64 and depth sample values of reference block 70, texture sample values of reference texture picture 62. The process of determining the texture sample values may be referred to as backward warping. Section H.8.5.2.2.7 of 3D-HEVC Test Model 3 describes the process of backward warping. Backward warping is shown as Step 3 of FIG. 5. In this way, FIG. 5 illustrates the three steps of how a depth block from the reference view is located and then used for BVSP prediction.

The motion compensation size (i.e., W*H as described above) used in BVSP could be either 8×4 or 4×8. To determine the motion compensation size, the following rule is applied. For each 8×8 block, the video coder checks four corners of corresponding depth 8×8 block and:

```
if (vdepth[TL] < vdepth[BR]?0 : 1)!= (vdepth[TR] < vdepth[BL]?0 : 1)
    use 4x8 partition ( W = 4, H = 8 )
else
    use 8x4 partition ( W = 8, H = 4 )
```

Figure 6:
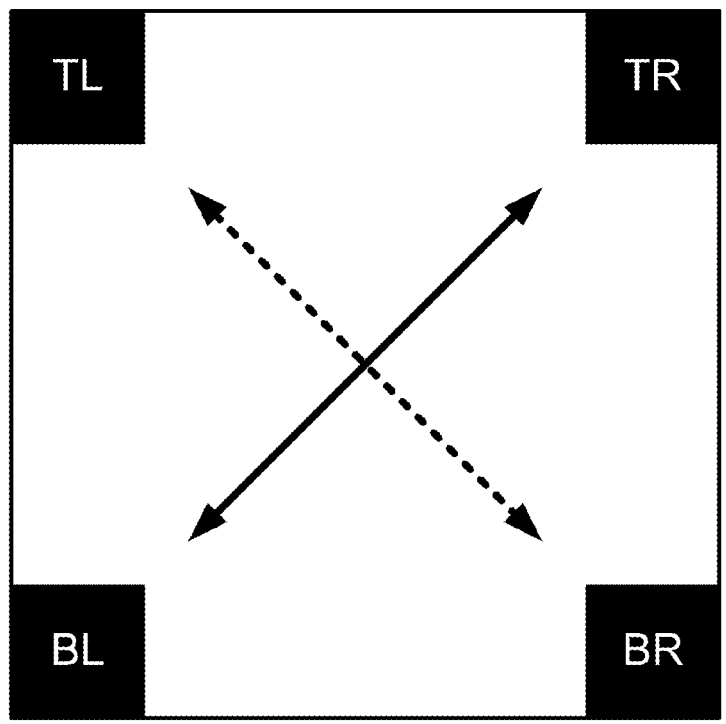
FIG. 6 is a conceptual diagram illustrating four corner pixels of one 8×8 depth block.

FIG. 6 is a conceptual diagram illustrating four corner pixels of one 8×8 depth block.

The maximum number of merge candidates and the merge list construction process for 3D-HEVC are described in the following paragraphs. In some versions of 3D-HEVC, the total number of candidates in the merge list is up to six and five_minus_max_num_merge_cand is signaled in a slice header to specify the maximum number of the merge candidates subtracted from five. five_minus_max_num_merge_cand is in the range of 0 to 5, inclusive. five_minus_max_num_merge_cand specifies the maximum number of merging motion vector predictor (MVP) candidates (i.e., merging candidates) supported in the slice subtracted from 5. A video coder may compute the maximum number of merging MVP candidates (i.e., MaxNumMergeCand) as:

MaxNumMergeCand=5−five_minus_max_num_merge_cand+iv_mv_pred_flag[nuh_layer_id]   (H-1)

In such versions of 3D-HEVC, the value of five_minus_max_num_merge_cand shall be limited such that MaxNumMergeCand is in the range of 0 to (5+iv_mv_pred_flag[nuh_layer_id]), inclusive.

Furthermore, in such versions of 3D-HEVC, an iv_mv_pred_flag[layerId] syntax element indicates whether inter-view motion parameter prediction is used in the decoding process of the layer with nuh_layer_id equal to layerId. iv_mv_pred_flag[layerId] equal to 0 specifies that inter-view motion parameter prediction is not used for the layer with nuh_layer_id equal to layerId. iv_mv_pred_flag[layerId] equal to 1 specifies that inter-view motion parameter prediction may be used for the layer with nuh_layer_id equal to layerId. When not present, the value of iv_mv_pred_flag[layerId] shall be inferred to be equal to 0.

The merging candidate list construction process in 3D-HEVC can be defined as follows:

1. IPMVC insertion: When inter-view motion prediction is applied, the video coder derives an IPMVC by the procedure described above. If the IPMVC is available, the video coder inserts the IPMVC into the merge list (i.e., the merge candidate list).

2. Derivation process for spatial merging candidates and IDMVC insertion in 3D-HEVC The video coder checks the motion information of spatial neighboring PUs in the following order: $A_1$, $B_1$, $B_0$, $A_0$, or $B_2$. Furthermore, the video coder may perform constrained pruning by the following procedures:

If $A_1$ (i.e., a merge candidate derived from spatial neighboring PU $A_1$) and IPMVC have the same motion vectors and the same reference indices, the video coder does not insert $A_1$ into the candidate list (i.e., the merge candidate list). Otherwise, the video coder inserts $A_1$ into the list (i.e., the merge candidate list).

If $B_1$ and $A_1$/IPMVC have the same motion vectors and the same reference indices, the video coder does not insert $B_1$ (i.e., a merge candidate derived from spatial neighboring PU $B_1$) into the candidate list (i.e., the merge candidate list). Otherwise, the video coder inserts $B_1$ into the list (i.e., the merge candidate list).

If $B_0$ (i.e., a merge candidate derived from spatial neighboring PU $B_0$) is available, the video coder adds $B_0$ to the candidate list (i.e., the merge candidate list).

When inter-view motion prediction is applied, the video coder derives an IDMVC by the procedure described above. If the IDMVC is available and the IDMVC is different from the candidates derived from $A_1$ and $B_1$, the video coder inserts the IDMVC into the candidate list (i.e., the merge candidate list).

If BVSP is enabled for the whole picture or for the current slice, then the video coder inserts the BVSP merging candidate into the merge candidate list.

If $A_0$ (i.e., a merge candidate derived from spatial neighboring PU $A_0$) is available, the video coder adds $A_0$ to the candidate list (i.e., the merge candidate list).

If $B_2$ (i.e., a merge candidate derived from spatial neighboring PU $B_2$) is available, the video coder adds $B_2$ to the candidate list (i.e., the merge candidate list).

When inter-view motion prediction is applied, the video coder inserts a shifted candidate (i.e., DSMV), if available, as described above.

3. Derivation process for temporal merging candidate

The derivation process for the temporal merging candidates is similar to the temporal merging candidate derivation process in HEVC where the motion information of the co-located PU is utilized. However, a target reference index of the temporal merging candidate may be changed instead of being fixed to be 0. The target reference index of the temporal merging candidate is the reference index of a reference picture on which the video coder bases the temporal merging candidate. When the target reference index equal to 0 corresponds to a temporal reference picture (i.e., a reference picture in the same view as the current PU) while the motion vector of the co-located PU points to an inter-view reference picture, the video coder changes the target reference index to an index that corresponds to the first entry of an inter-view reference picture in the reference picture list. In other words, the video coder changes the target reference index such that the target reference index indicates the first inter-view reference picture in the reference picture list. However, when the target reference index equal to 0 corresponds to an inter-view reference picture while the motion vector of the co-located PU points to a temporal reference picture, the video coder changes the target reference index to another index that corresponds to the first entry of a temporal reference picture in the reference picture list. In other words, the video coder changes the target reference index such that the target reference index indicates the first temporal reference picture in the reference picture list.

4. Derivation process for combined bi-predictive merging candidates in 3D-HEVC

If the total number of candidates derived from the above three steps is less than the maximum number of candidates, the video coder performs the same process as defined in HEVC with two changes:

First, the conditions of obtaining a combined bi-predictive merging candidate are changed by adding the check of BVSP flags associated with the first/second candidate.

Second, the specification of l0CandIdx and l1CandIdx is modified. The relationship among combIdx, l0CandIdx and l1CandIdx are defined in FIG. 7, which is a table providing a specification of l0CandIdx and l1CandIdx in 3D-HEVC.

5. Derivation process for zero motion vector merging candidates

The video coder performs the same procedure as defined in HEVC (and described above) to derive the zero motion vector merging candidates.

The design of the derivation process of combined bi-predictive merging candidates in 3D-HEVC may have one or more potential problems. For example, the current design of the derivation process of combined bi-predictive merging candidates in 3D-HEVC may require additional logic units to be added to check the BVSP flags of the first and second existing merge candidates used to construct a combined bi-predictive merging candidate. However, the additional check of the BVSP flags does not help in terms of coding efficiency. Thus, the additional check of the BVSP flags increases complexity.

In another example of the potential problems associated with the derivation process of combined bi-predicted merging candidates in 3D-HEVC, directly reusing the HEVC derivation process of combined bi-predictive merging candidates may result in an unpredictable decoding process. The HEVC derivation process of combined bi-predictive merging candidates can only take up to four merge candidates to generate new candidates. However, if this process is used in 3D-HEVC directly, there can be a case that five merge candidates are used as an input for this process. When there are up to four merge candidates, only twelve possible combinations are available, thus they are defined in this process in a table. However, when five merge candidates are available, there can be twenty possible combinations, while the current table (i.e., Table 1, above) does not support that many combinations.

One or more of the techniques of this disclosure relate to the derivation process of combined bi-predictive merging candidates in 3D-HEVC. In accordance with an example technique of this disclosure, the design of the derivation process of combined bi-predictive merging candidates in 3D-HEVC is replaced by that used in HEVC. Therefore, there is no need to check the BVSP flags in the combined bi-predictive merging candidate derivation process. In other words, the process of generating the list of merging candidates occurs without checking any BVSP flags. Not checking the BVSP flags in the combined bi-predictive merging candidate derivation process may reduce complexity of the encoding/decoding process without making a significant negative impact on coding efficiency.

In this way, this disclosure may provide for a method of coding data associated with 3D video. This method may comprise generating a list of merge candidates for coding a video block associated with 3D video according to a merging list derivation process. The list includes one or more bi-predictive merge candidates. The merging list derivation process for 3D video corresponds to a same merging list derivation process that is associated with non-3D video.

Furthermore, in accordance with one or more techniques of this disclosure, when invoking the derivation process of combined bi-predictive merging candidates in HEVC, instead of just checking that the slice type is equal to B slice, another condition shall be also satisfied, that is, the number of available merging candidates inserted to the merge candidate list should be less than five.

Thus, in some examples, a video coder may code data associated with 3D video. As part of coding the data, the video coder may generate a list of merging candidates for coding a video block (e.g. a PU) of the 3D video. As part of generating the list of merging candidates, the video coder may determine whether a number of merging candidates in the list is less than 5. In response to determining that the number of merging candidates in the list is less than 5, the video coder may derive one or more combined bi-predictive merging candidates. In this example, each respective combined bi-predictive merging candidate of the one or more combined bi-predictive merging candidates corresponds to a respective pair (e.g., an ordered pair) of merging candidates already in the list. The respective combined bi-predictive merging candidate is a combination of a motion vector of a first merging candidate of the respective pair and a motion vector of a second merging candidate of the respective pair. The motion vector of the first merging candidate and the motion vector of the second merging candidate refer to pictures in different reference picture lists. The video coder may include the one or more combined bi-predictive merging candidates in the list of merging candidates.

Alternatively, in some examples, before the derivation process of combined bi-predictive merging candidates is invoked, the maximum number of merging MVP candidates, MaxNumMergeCand is reset as follows: MaxNumMerge- Cand=5−five_minus_max_num_merge_cand. After the derivation process of combined bi-predictive merging candidates is invoked, the MaxNumMergeCand is set back to the value as in 3D-HEVC: MaxNumMergeCand=5−five_minus_max_num_merge_cand+iv_mv_pred_flag[nuh_layer_id]. nuh_layer_id is a syntax element specifying a layer identifier. Thus, in some such examples, before deriving the one or more combined bi-predictive merging candidates, a video coder may reset a maximum number of merging candidates to be equal to 5 minus a value of a first syntax element. The first syntax element specifies the maximum number of merging candidates supported in a slice subtracted from 5. After deriving the one or more combined bi-predictive merging candidates, the video coder may set the maximum number of merging candidates to 5 minus the value of the first syntax element plus a value of a second syntax element, wherein the second syntax element indicates whether inter-view motion parameter prediction is used in a decoding process of a layer.

When MaxNumMergeCand is equal to 6 and there are five candidates before the derivation process of combined bi-predictive merging candidates in HEVC is invoked, a zero candidate (with reference index and motion vector components all being 0) is always generated and inserted into the merging candidate list, as specified in sub-clause 8.5.3.2.4 of HEVC Working Draft 10.

Alternatively, the video coder sets MaxNumMergeCand to 5 before the invocation of the process to determine bi-predictive merging candidates and the video coder only considers the first four candidates as input of this process. After the video coder invokes the process to determine bi-predictive merging candidates, the video coder puts the newly generated bi-predictive merging candidate, if available at the end of the merging candidate list. Thus, the newly-generated bi-predictive merging candidate follows the $4^{th}$ candidate in the merging candidate list, which the video coder did not consider as part of the input of the process to determine bi-predictive merging candidates. Afterwards, in this example, the MaxNumMergeCand is set back to 6. When the process to determine bi-predictive merging candidates does not provide a new bi-predictive merging candidate, the video coder generates a zero candidate and inserts the zero candidate into the merging candidate list, as specified in sub-clause 8.5.3.2.4 of HEVC Working Draft 10. Sub-clause 8.5.3.2.4 of HEVC Working Draft 10 is reproduced below.

8.5.3.2.4 Derivation Process for Zero Motion Vector Merging Candidates

Inputs to this process are:
 a merging candidate list mergeCandList,
 the reference indices refIdxL0N and refIdxL1N of every candidate N in mergeCandList,
 the prediction list utilization flags predFlagL0N and predFlagL1N of every candidate N in mergeCandList,
 the motion vectors mvL0N and mvL1N of every candidate N in mergeCandList,
 the number of elements numCurrMergeCand within mergeCandList.

Outputs of this process are:
 the merging candidate list mergeCandList,
 the number of elements numCurrMergeCand within mergeCandList,
 the reference indices refIdxL0zeroCand$_m$ and refIdxL10zeroCand$_m$ of every new candidate zeroCand$_m$ added into mergeCandList during the invokation of this process,
 the prediction list utilization flags predFlagL0zeroCand$_m$ and predFlagL10zeroCand$_m$ of every new candidate zeroCand$_m$ added into mergeCandList during the invokation of this process,
 the motion vectors mvL0zeroCand$_m$ and myL10zeroCand$_m$ of every new candidate zeroCand$_m$ added into mergeCandList during the invokation of this process.

The variable numRefIdx is derived as follows:
 If slice_type is equal to P, numRefIdx is set equal to num_ref_idx_l0_active_minus_1+1.
 Otherwise (slice_type is equal to B), numRefIdx is set equal to Min(num_ref_idx_l0_active_minus1+1, num_ref_idx_l1_active_minus1+1).

When numCurrMergeCand is less than MaxNumMergeCand, the variable numInputMergeCand is set equal to numCurrMergeCand, the variable zeroIdx is set equal to 0, and the following steps are repeated until numCurrMergeCand is equal to MaxNumMergeCand:

1. For the derivation of the reference indices, the prediction list utilization flags and the motion vectors of the zero motion vector merging candidate, the following applies:
 If slice_type is equal to P, the candidate zeroCand$_m$ with m equal to (numCurrMergeCand−numInputMergeCand) is added at the end of mergeCandList, i.e. mergeCandList[numCurrMergeCand] is set equal to zeroCand$_m$, and the reference indices, the prediction list utilization flags, and the motion vectors of zeroCand$_m$ are derived as follows and numCurrMergeCand is incremented by 1:

refIdxL0zeroCand$_m$=(zeroIdx<numRefIdx)?zeroIdx:0  (8-122)

refIdxL1zeroCand$_m$=−1  (8-123)

predFlagL0zeroCand$_m$=1  (8-124)

predFlagL1zeroCand$_m$=0  (8-125)

mvL0zeroCand$_m$[0]=0  (8-126)

mvL0zeroCand$_m$[1]=0  (8-127)

mvL1zeroCand$_m$[0]=0  (8-128)

mvL1zeroCand$_m$[1]=0  (8-129)

numCurrMergeCand=numCurrMergeCand+1  (8-130)

Otherwise (slice_type is equal to B), the candidate zeroCand$_m$ with m equal to (numCurrMergeCand−numInputMergeCand) is added at the end of mergeCandList, i.e. mergeCandList[numCurrMergeCand] is set equal to zeroCand$_m$, and the reference indices, the prediction list utilization flags, and the motion vectors of zeroCand$_m$ are derived as follows and numCurrMergeCand is incremented by 1:

refIdxL0zeroCand$_m$=(zeroIdx<numRefIdx)?zeroIdx:0  (8-131)

refIdxL1zeroCand$_m$=(zeroIdx<numRefIdx)?zeroIdx:0  (8-132)

predFlagL0zeroCand$_m$=1  (8-133)

predFlagL1zeroCand$_m$=1  (8-134)

mvL0zeroCand$_m$[0]=0  (8-135)

mvL0zeroCand$_m$[1]=0  (8-136)

mvL1zeroCand$_m$[0]=0 (8-137)

mvL1zeroCand$_m$[1]=0 (8-138)

numCurrMergeCand=numCurrMergeCand+1 (8-139)

2. The variable zeroIdx is incremented by 1.

Thus, in some examples where the maximum number of merging candidates (e.g., MaxNumMergeCand) is equal to 6, a video coder may, in response to determining that there are 5 merging candidates in the list of merging candidates prior to adding any of the one or more bi-predictive merging candidates to the list, the video coder may include a zero candidate in the list. Motion vector components of the zero candidate are equal to 0 and a reference index of the zero candidate is equal to 0.

The following section of this disclosure describes some exemplary implementation details consistent with the techniques of this disclosure in the context of HEVC. Changes to sections of 3D-HEVC Draft Text 1 are shown below. Various parts shown between <insert>. . . </insert> may correspond to additions to HEVC sections, and parts shown between <delete>. . . </delete> may correspond to deletions. Techniques of this disclosure may correspond, in some examples to the additions shown between <insert>. . . </insert> and the deletions shown between <delete>. . . </delete>.

H.8.5.3.2.1 Derivation Process for Luma Motion Vectors for Merge Mode

This process is only invoked when merge_flag[xPb][yPb] is equal to 1, where (xPb, yPb) specify the top-left sample of the current luma prediction block relative to the top-left luma sample of the current picture.

Inputs to this process are:
  a luma location (xCb, yCb) of the top-left sample of the current luma coding block relative to the top-left luma sample of the current picture,
  a luma location (xPb, yPb) of the top-left sample of the current luma prediction block relative to the top-left luma sample of the current picture,
  a variable nCbS specifying the size of the current luma coding block,
  two variables nPbW and nPbH specifying the width and the height of the luma prediction block,
  a variable part Idx specifying the index of the current prediction unit within the current coding unit.

Outputs of this process are:
  the luma motion vectors mvL0 and mvL1,
  the reference indices refIdxL0 and refIdxL1,
  the prediction list utilization flags predFlagL0 and predFlagL1,
  the disparity vector availability flags ivpMvFlagL0 and ivpMvFlagL1,
  the flag vspModeFlag, specifying, whether the current PU is coded using view synthesis prediction, The location (xOrigP, yOrigP) and the variables nOrigPbW and nOrigPbH are derived to store the values of (xPb, yPb), nPbW, and nPbH as follows:

(xOrigP,yOrigP) is set equal to (xPb,yPb) (H-81)

nOrigPbW=nPbW (H-82)

nOrigPbH=nPbH (H-83)

When Log 2 ParMrgLevel is greater than 2 and nCbS is equal to 8, (xPb, yPb), nPbW, nPbH, and part Idx are modified as follows:

(xPb,yPb)=(xCb,yCb) (H-84)

nPbW=nCbS (H-85)

nPbH=nCbS (H-86)

partIdx=0 (H-87)

NOTE—When Log 2 ParMrgLevel is greater than 2 and nCbS is equal to 8, all the prediction units of the current coding unit share a single merge candidate list, which is identical to the merge candidate list of the 2N×2N prediction unit.

The motion vectors mvL0 and mvL1, the reference indices refIdxL0 and refIdxL1, and the prediction utilization flags predFlagL0 and predFlagL1 are derived by the following ordered steps:
  1. The derivation process for merging candidates from neighboring prediction unit partitions in subclause 8.5.3.2.2 is invoked with the luma coding block location (xCb, yCb), the coding block size nCbS, the luma prediction block location (xPb, yPb), the luma prediction block width nPbW, the luma prediction block height nPbH, and the partition index part Idx as inputs, and the output being the availability flags availableFlagA$_0$, availableFlagA$_1$, availableFlagB$_0$, availableFlagB$_1$, and availableFlagB$_2$, the reference indices refIdxLXA$_0$, refIdxLXA$_1$, refIdxLXB$_0$, refIdxLXB$_1$, and refIdxLXB$_2$, the prediction list utilization flags predFlagLXA$_0$, predFlagLXA$_1$, predFlagLXB$_0$, predFlagLXB$_1$, and predFlagLXB$_2$, and the motion vectors mvLXA$_0$, mvLXA$_1$, mvLXB$_0$, mvLXB$_1$, and mvLXB$_2$, with X being 0 or 1.
  2. The reference indices for the temporal merging candidate, refIdxLXCol, with X being 0 or 1, are set equal to 0.
  3. The derivation process for temporal luma motion vector prediction in subclause H.8.5.3.2.7 is invoked with the luma location (xPb, yPb), the luma prediction block width nPbW, the luma prediction block height nPbH, and the variable refIdxL0Col as inputs, and the output being the availability flag availableFlagL0Col and the temporal motion vector mvL0Col. The variables availableFlagCol, predFlagL0Col and predFlagL1Col are derived as follows:

availableFlagCol=availableFlagL0Col (H-88)

predFlagL0Col=availableFlagL0Col (H-89)

predFlagL1Col=0 (H-90)

4. When slice_type is equal to B, the derivation process for temporal luma motion vector prediction in subclause H.8.5.3.2.7 is invoked with the luma location (xPb, yPb), the luma prediction block width nPbW, the luma prediction block height nPbH, and the variable refIdxL1Col as inputs, and the output being the availability flag availableFlagL1Col and the temporal motion vector mvL1Col. The variables availableFlagCol and predFlagL1Col are derived as follows:

availableFlagCol=availableFlagL0Col||availableFlagL1Col (H-91)

predFlagL1Col=availableFlagL1Col (H-92)

5. Depending on iv_mv_pred_flag[nuh_layer_id], the following applies.
    If iv_mv_pred_flag[nuh_layer_id] is equal to 0, the flags availableFlagIvMC, availableIvMCShift and availableFlagIvDC are set equal to 0.
    Otherwise (iv_mv_pred_flag[nuh_layer_id] is equal to 1), the derivation process for the inter-view merge candidates as specified in subclause H.8.5.3.2.10 is invoked with the luma location (xPb, yPb), the variables nPbW and nPbH, as the inputs and the output is assigned to the availability flags availableFlagIvMC, availableIvMCShift and availableFlagIvDC, the reference indices refIdxLXIvMC, refIdxLXIvMCShift and refIdxLXIvDC, the prediction list utilization flags predFlagLXIvMC, predFlagLXivMCShift and predFlagLXIvDC, and the motion vectors mvLXIvMC, mvLXIvMCShift and mvLXIvDC (with X being 0 or 1, respectively).
6. Depending on view_synthesis_pred_flag[nuh_layer_id], the following applies.
    If view_synthesis_pred_flag[nuh_layer_id] is equal to 0, the flag availableFlagVSP is set equal to 0.
    Otherwise (view_synthesis_pred_flag[nuh_layer_id] is equal to 1), the derivation process for a view synthesis prediction merge candidate as specified in subclause H.8.5.3.2.13 is invoked with the luma locations (xCb, yCb) as input and the outputs are the availability flag availableFlagVSP, the reference indices refIdxL0VSP and refIdxL1VSP, the prediction list utilization flags predFlagL0VSP and predFlagL1VSP, and the motion vectors mvL0VSP and mvL1VSP.
7. Depending on DepthFlag, the following applies.
    If DepthFlag is equal to 0, the variable availableFlagT is set equal to 0.
    Otherwise (DepthFlag is equal to 1), the derivation process for the texture merging candidate as specified in subclause H.8.5.3.2.14 is invoked with the luma location (xPb, yPb), the variables nPbW and nPbH as the inputs and the outputs are the flag availableFlagT, the prediction utilization flags predFlagL0T and predFlagL1T, the reference indices refIdxL0T and refIdxL1T, and the motion vectors mvL0T and mvL1T.
8. The merge candidate lists mergeCandList and mergeCandIsVspFlag are constructed as specified by the following ordered steps:
    a. The variable numMergeCand is set equal to 0.
    b. When availableFlagT is equal to 1, the entry mergeCandList[numMergeCand] is set equal to T, the entry mergeCandIsVspFlag[numMergeCand] is set equal to 0 and the variable numMergeCand is increased by 1.
    c. When availableFlagIvMC is equal to 1, the entry mergeCandList[numMergeCand] is set equal to IvMC, the entry mergeCandIsVspFlag[numMergeCand] is set equal to 0 and the variable numMergeCand is increased by 1.
    d. When availableFlag$A_1$ is equal to 1, the following applies:
        When the following condition is true,
            availableFlagT==0 && availableFlagIvMC==0,
        or one or more of the following conditions are true, with N being replaced by T and IvMC:
            availableFlagN==1 && predFlagLXN !=predFlagLX$A_1$, (with X being replaced by 0 and 1),
            availableFlagN==1 && mvLXN !=mvLX$A_1$ (with X being replaced by 0 and 1),
            availableFlagN==1 && refIdxLXN !=refIdxLX$A_1$ (with X being replaced by 0 and 1),
        the entry mergeCandList[numMergeCand] is set equal to $A_1$, the entry mergeCandIsVspFlag[numMergeCand] is set equal to VspModeFlag[xPb−1][yPb+nPbH−1] and the variable numMergeCand is increased by 1.
    e. When availableFlag$B_1$ is equal to 1, the following applies:
        When the following condition is true,
            availableFlagT==0 && availableFlagIvMC==0,
        or one or more of the following conditions is true, with N being replaced by T and IvMC:
            availableFlagN==1 && predFlagLXN !=predFlagLX$B_1$, (with X being replaced by 0 and 1),
            availableFlagN==1 && mvLXN !=mvLX$B_1$ (with X being replaced by 0 and 1),
            availableFlagN==1 && refIdxLXN !=refIdxLX$B_1$ (with X being replaced by 0 and 1),
        the entry mergeCandList[numMergeCand] is set equal to $B_1$, the entry mergeCandIsVspFlag[numMergeCand] is set equal to VspModeFlag[xPb+nPbW−1][yPb−1] and the variable numMergeCand is increased by 1.
    f. When availableFlag$B_0$ is equal to 1, the entry mergeCandList[numMergeCand] is set equal to $B_0$, the entry mergeCandIsVspFlag[numMergeCand] is set equal to VspModeFlag[xPb+nPbW][yPb−1] and the variable numMergeCand is increased by 1.
    g. When availableFlagIvDC is equal to 1, and one or more of the following conditions is true,
        availableFlagA1==0,
        predFlagLXA1 !=predFlagLXIvDC, (with X being replaced by 0 and 1),
        mvLX$A_1$ !=mvLXIvDC (with X being replaced by 0 and 1),
        refIdxLX$A_1$ !=refIdxLXIvDC (with X being replaced by 0 and 1), and one or more of the following conditions is true,
        availableFlag$B_1$==0,
        predFlagLX$B_1$ !=predFlagLXIvDC, (with X being replaced by 0 and 1),
        mvLX$B_1$ !=mvLXIvDC (with X being replaced by 0 and 1),
        refIdxLX$B_1$ !=refIdxLXIvDC (with X being replaced by 0 and 1), the entry mergeCandList[numMergeCand] is set equal to IvDC, the entry mergeCandIsVspFlag[numMergeCand] is set equal to 0 and the variable numMergeCand is increased by 1.
    h. When availableFlagVSP is equal to 1, the entry mergeCandList[numMergeCand] is set equal to VSP, the entry mergeCandIsVspFlag[numMergeCand] is set equal 1 and the variable numMergeCand is increased by 1.
    i. When availableFlag$A_0$ is equal to 1, the entry mergeCandList[numMergeCand] is set equal to $A_0$, the entry mergeCandIsVspFlag[numMergeCand] is set equal to VspModeFlag[xPb−1][yPb+nPbH] and the variable numMergeCand is increased by 1.
    j. When availableFlag$B_2$ is equal to 1 and numMergeCand is less than 4+iv_mv_pred_flag[nuh_layer_id]+DepthFlag, the entry mergeCandList[numMergeCand] is set equal to $B_2$, the entry mergeCandIsVspFlag[numMergeCand] is set equal to VspModeFlag[xPb−1][yPb−1] and the variable numMergeCand is increased by 1.

k. When availableFlagIvMCShift is equal to 1 and numMergeCand is less than 6, and one or more of the following conditions are true,
availableFlagIvMC==0,
predFlagLXMC !=predFlagLXMCShift (with X being replaced by 0 and 1),
mvLXMC !=mvLXIvMCShift (with X being replaced by 0 and 1),
refIdxLXMC !=refIdxLXMCShift (with X being replaced by 0 and 1), the entry mergeCandList[numMergeCand] is set equal to IvMCShift, the entry mergeCandIsVspFlag[numMergeCand] is set equal to 0 and the variable numMergeCand is increased by 1.

l. A variable availableFlagIvDCShift is set to 0 and when all of the following conditions are true
DepthFlag is equal to 0,
availableFlagIvMCShift is equal to 0,
numMergeCand is less than 6,
the derivation process for the shifted disparity merging candidate as specified in subclause H.8.5.3.2.15 is invoked with the availability flags availableFlagN, the reference indices refIdxL0N and refIdxL1N, the prediction list utilization flags predFlagL0N and predFlagL1N, the motion vectors mvL0N and mvL1N, of every candidate N being in mergeCandList, mergeCandList, mergeCandIsVspFlag, and numMergeCand as the inputs and the outputs are the flag availableFlagIvDCShift, the prediction utilization flags predFlagL0IvDCShift and predFlagL1IvDCShift, the reference indices refIdxL0IvDCShift and refIdxL1IvDCShift, and the motion vectors mvL0IvDCShift and mvL1IvDCShift. When availableFlagIvDCShift is equal to 1, the entry mergeCandList[numMergeCand] is set equal to IvDCShift, the entry mergeCandIsVspFlag[numMergeCand] is set equal to 0 and the variable numMergeCand is increased by 1.

m. When availableFlagCol is equal to 1 and numMergeCand is less than 5+iv_mv_pred_flag[nuh_layer_id]+DepthFlag, the entry mergeCandList[numMergeCand] is set equal to Col, the entry mergeCandIsVspFlag[numMergeCand] is set equal to 0 and the variable numMergeCand is increased by 1.

9. The variable numOrigMergeCand is set equal to numMergeCand.

10. When slice_type is equal to B <insert> and numMergeCand is less than 5</insert>, the derivation process for combined bi-predictive merging candidates specified in subclause <insert> 8.5.3.2.3 </insert><delete> H.8.5.3.2.3 </delete> is invoked with mergeCandList, <delete> mergeCandIsVspFlag </delete> the reference indices refIdxL0N and refIdxL1N, the prediction list utilization flags predFlagL0N and predFlagL1N, the motion vectors mvL0N and mvL1N of every candidate N in mergeCandList, numCurrMergeCand, and numOrigMergeCand as inputs, and the output is assigned to mergeCandList, numCurrMergeCand, the reference indices refIdxL0combCand$_k$ and refIdxL1combCand$_k$, the prediction list utilization flags predFlagL0combCand$_k$ and predFlagL1combCand$_k$, and the motion vectors mvL0combCand$_k$ and mvL1combCand$_k$ of every new candidate combCand$_k$ being added into mergeCandList. The number of candidates being added, numCombMergeCand, is set equal to (numCurrMergeCand−numOrigMergeCand). When numCombMergeCand is greater than 0, k ranges from 0 to numCombMergeCand−1, inclusive <delete>, and mergeCandIsVspFlag[numOrigMergeCand+k] is set equal to 0.

11. The derivation process for zero motion vector merging candidates specified in subclause 8.5.3.2.4 is invoked with the mergeCandList, the reference indices refIdxL0N and refIdxL1N, the prediction list utilization flags predFlagL0N and predFlagL1N, the motion vectors mvL0N and mvL1N of every candidate N in mergeCandList, and numCurrMergeCand as inputs, and the output is assigned to mergeCandList, numCurrMergeCand, the reference indices refIdxL0zeroCand$_m$ and refIdxL1zeroCand$_m$, the prediction list utilization flags predFlagL0zeroCand$_m$ and predFlagL1zeroCand$_m$, and the motion vectors mvL0zeroCand$_m$ and mvL1zeroCand$_m$ of every new candidate zeroCand$_m$ being added into mergeCandList. The number of candidates being added, numZeroMergeCand, is set equal to (numCurrMergeCand−numOrigMergeCand−numCombMergeCand). When numZeroMergeCand is greater than 0, m ranges from 0 to numZeroMergeCand−1, inclusive <insert>, and mergeCandIsVspFlag[numOrigMergeCand+numCombMergeCand+m] is set equal to 0 </insert>, <delete> H. 8.5.3.2.3 Derivation process for combined bi-predictive merging candidates Inputs to this process are:
a merging candidate list mergeCandList.
a list mergeCandIsVspFlag,
the reference indices refIdxL0N and refIdxL1N of every candidate N in mergeCandList,
the prediction list utilization flags predFlagL0N and predFlagL1N of every candidate N in mergeCandList,
the motion vectors mvL0N and mvL1N of every candidate N in mergeCandList,
the number of elements numCurrMergeCand within mergeCandList,
the number of elements numOrigMergeCand within the mergeCandList after the spatial and temporal merge candidate derivation process.
Outputs of this process are:
the merging candidate list mergeCandList,
the number of elements numCurrMergeCand within mergeCandList,
the reference indices refIdxL0combCandk and refIdxL1combCandk of every new candidate combCandk added into mergeCandList during the invokation of this process,
the prediction list utilization flags predFlagL0combCandk and predFlagL1combCandk of every new candidate combCandk added into mergeCandList during the invokation of this process,
the motion vectors mvL0combCandk and mvL1combCandk of every new candidate combCandk added into mergeCandList during the invokation of this process.
When numOrigMergeCand is greater than 1 and less than MaxNumMergeCand, the variable numInputMergeCand is set equal to numCurrMergeCand, the variable combIdx is set equal to 0, the variable combStop is set equal to FALSE, and the following steps are repeated until combStop is equal to TRUE:
1. The variables l0CandIdx and l1CandIdx are derived using combIdx as specified in Table 8-6.
2. The following assignments are made, with l0Cand being the candidate at position l0CandIdx and l1Cand being the candidate at position l1CandIdx in the merging candidate list mergeCandList:
l0Cand=mergeCandList[l0CandIdx ]
l1Cand=mergeCandList[l1CandIdx ]
3. When all of the following conditions are true:
mergeCandIsVspFlag[l0CandIdx ]==0,
mergeCandIsVspFlag[l1CandIdx ]==0,
predFlagL0l0Cand==1
predFlagL1l1Cand==1
(DiffPicOrderCnt(RefPicList0[refIdxL0l0Cand],
    RefPicList1 [refIdxL1l1C and]) !=0)||
(mvL0l0Cand !=mvL1l1Cand)
the candidate combCand$_k$ with k equal to (numCurrMergeCand−numInputMergeCand) is added at the end of mergeCandList, i.e. mergeCandList[numCurrMergeCand] is set equal to combCand$_k$, and the reference indices, the prediction list utilization flags, and the motion vectors of combCand$_k$ are derived as follows and numCurrMergeCand is incremented by 1:

refIdxL0combCand$_k$=refIdxL0l0Cand     (H-101)

refIdxL1combCand$_k$=refIdxL1l1Cand     (H-102)

predFlagL0combCand$_k$=1     (H-103)

predFlagL1combCand$_k$=1     (H-104)

mvL0combCand$_k$[0]=mvL0l0Cand[0]     (H-105)

mvL0combCand$_k$[1]=mvL0l0Cand[1]     (H-106)

mvL1combCand$_k$[0]=mvL1l1Cand[0]     (H-107)

mvL1combCand$_k$[1]=mvL1l1Cand[1]     (H-108)

numCurrMergeCand=numCurrMergeCand+1     (H-109)

4. The variable combIdx is incremented by 1.
When combIdx is equal to (numOrigMergeCand*(numOrigMergeCand−1)) or numCurrMergeCand is equal to MaxNumMergeCand, combStop is set equal to TRUE. </delete>

As shown above, "mergeCandIsVspFlag" is any array of BVSP flags defined in section H.8.5.3.2.1 of 3D-HEVC Draft Text 1. Each value in the "mergeCandIsVspFlag" array corresponds to a merging candidate in the list and indicates whether the corresponding merging candidate is based on BVSP. In step 10 of section H.8.5.3.2.1 "mergeCandIsVspFlag" is deleted, such that "mergeCandIsVspFlag" is not provided as an input to the derivation process for combined bi-predictive merging candidates. Furthermore, in accordance with one or more techniques of this disclosure, section H.8.5.3.2.3 is deleted from 3D-HEVC Draft Text 1 because the derivation process for combined bi-predictive merging candidates is the same in 3D-HEVC as that defined in HEVC (i.e., section 8.5.3.2.3 of HEVC Working Draft 10). Additionally, in accordance with one or more techniques of this disclosure, as shown in the text above, mergeCandIsVspFlag[numOrigMergeCand+k] is not set equal to 0 because it is no longer necessary to do so.

Figure 8:
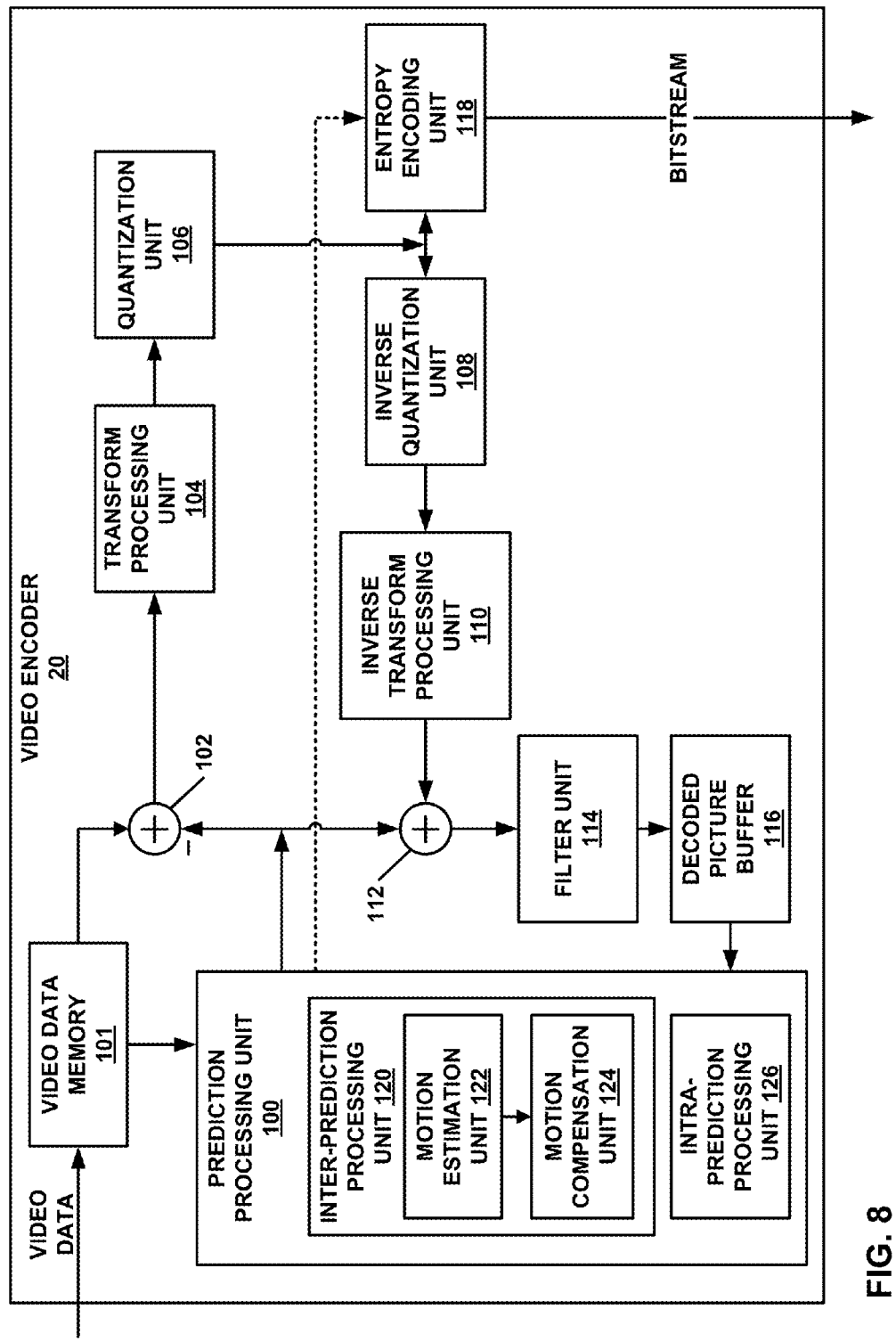
FIG. 8 is a block diagram illustrating an example video encoder that may implement the techniques of this disclosure.

FIG. 8 is a block diagram illustrating an example video encoder 20 that may implement the techniques of this disclosure. FIG. 8 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 8, video encoder 20 includes a prediction processing unit 100, a video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video data memory 101 may store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components.

Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, in some examples, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs may be intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame.

If a PU is in a P slice, motion estimation unit 122 may search the reference pictures in a list of reference pictures (e.g., "RefPicList0") for a reference region for the PU. The reference region for the PU may be a region, within a reference picture, that contains sample blocks that most closely correspond to the sample blocks of the PU. Motion estimation unit 122 may generate a reference index that indicates a position in RefPicList0 of the reference picture containing the reference region for the PU. In addition, motion estimation unit 122 may generate a motion vector that indicates a spatial displacement between a coding block of the PU and a reference location associated with the reference region. For instance, the motion vector may be a two-dimensional vector that provides an offset from the coordinates in the current picture to coordinates in a reference picture. Motion estimation unit 122 may output the reference index and the motion vector as the motion information of the PU. Motion compensation unit 124 may generate the predictive blocks (i.e., predictive blocks) of the PU based on actual or interpolated samples associated with the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, a motion vector that indicates a spatial displacement between a sample block of the PU and a reference location associated with the reference region, and one or more prediction direction indicators that indicate whether the reference picture is in RefPicList0 or RefPicList1. Motion compensation unit 124 may generate the predictive blocks of the PU based at least in part on actual or interpolated samples associated with the reference location indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference indices that indicate positions in RefPicList0 and RefPicList1 of the reference pictures that contain the reference regions. In addition, motion estimation unit 122 may generate motion vectors that indicate spatial displacements between the reference locations associated with the reference regions and a prediction block (e.g., a sample block) of the PU. The motion information of the PU may include the reference indices and the motion vectors of the PU. Motion compensation unit 124 may generate the predictive blocks of the PU based at least in part on actual or interpolated samples associated with the reference region indicated by the motion vectors of the PU.

In accordance with one or more techniques of this disclosure, motion estimation unit 122 may generate a list of merging candidates for coding a video block of 3D video. As part of generating the list of merging candidates, motion estimation unit 122 may determine whether a number of merging candidates in the list of merging candidates is less than 5. In response to determining that the number of merging candidates in the list of merging candidates is less than 5, motion estimation unit 122 may derive one or more combined bi-predictive merging candidates. Motion estimation unit 122 may include the one or more combined bi-predictive merging candidates in the list of merging candidates. Furthermore, in some examples, motion estimation unit 122 may select a merging candidate in the list of merging candidates. Video encoder 20 may signal a position in the list of merging candidates of the selected merging candidate. In some examples, the maximum number of merging candidates in the list of merging candidates is equal greater than 5 (e.g., 6).

Continued reference is now made to the example of FIG. 8. Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. To use some intra prediction modes to generate a set of predictive data for the PU, intra-prediction processing unit 126 may extend samples from neighboring blocks across the predictive block of the PU in a direction associated with the intra prediction mode. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) of a CU and the selected predictive blocks (e.g., predictive luma, Cb and Cr blocks) of the PUs of the CU, residual blocks (e.g., residual luma, Cb and Cr residual blocks) of the CU. In other words, residual generation unit 102 may generate a residual signal for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks corresponding to (i.e., associated with) TUs of the CU. Thus, a TU may be associated with a luma transform block and two chroma transform blocks. The sizes and positions of the transform blocks (e.g., luma and chroma transform blocks) of TUs of a CU may or may not be based on the sizes and positions of prediction blocks of the PUs of the CU. A quad-tree structure known as a "residual quad-tree" (RQT) may include nodes associated with each of the TUs. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a transform coefficient block. The quantization process may reduce the bit depth associated with some or all of the transform coefficients of a transform coefficient block. For example, an n-bit transform coefficient may be rounded down to an m-bit transform coefficient during quantization, where n is greater than m. Quantization unit 106 may quantize a transform coefficient block associated with a TU of a CU based on a quantization parameter (QP) value associated with the CU. Video encoder 20 may adjust the degree of quantization applied to the transform coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a transform coefficient block, respectively, to reconstruct a residual block (i.e., a transform block) from the transform coefficient block. Reconstruction unit 112 may reconstruct a coding block of a CU such that each sample of the coding block is equal to a sum of a sample of a predictive block of a PU of the CU and a corresponding sample of a transform block of a TU of the CU. For example, reconstruction unit 112 may add reconstructed residual blocks of TUs of a CU to corresponding samples from one or more predictive blocks of PUs of the CU generated by prediction processing unit 100 to produce a reconstructed coding blocks of the CU. Thus, by reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Thus, decoded picture buffer 116 may be a memory configured to store video data. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU. The bitstream may include data that is not entropy encoded.

Figure 9:
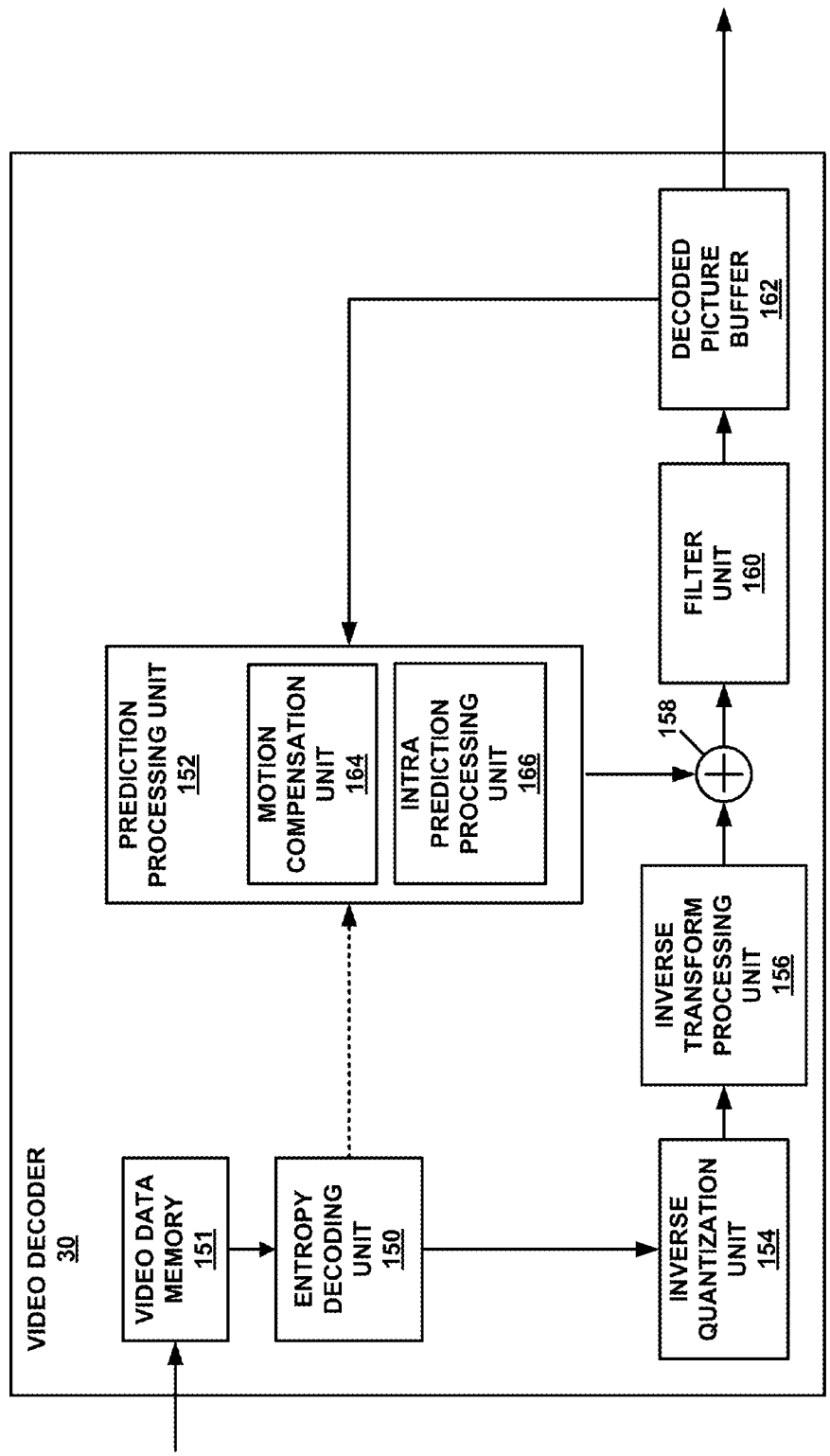
FIG. 9 is a block diagram illustrating an example video decoder that may implement the techniques of this disclosure.

FIG. 9 is a block diagram illustrating an example video decoder 30 that is configured to implement the techniques of this disclosure. FIG. 9 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 9, video decoder 30 includes an entropy decoding unit 150, a video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video decoder 30 may receive a bitstream. Video data memory 151 may store video data, such as an encoded video bitstream, to be decoded by the components of video decoder 30. The video data stored in video data memory 151 may be obtained, for example, from channel 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components.

Entropy decoding unit 150 may parse the bitstream to decode syntax elements from the bitstream. Entropy decoding unit 150 may entropy decode entropy-encoded syntax elements in the bitstream. Prediction processing unit 152, inverse quantization unit 154, inverse transform processing unit 156, reconstruction unit 158, and filter unit 160 may generate decoded video data based on the syntax elements obtained (e.g., extracted) from the bitstream.

The bitstream may comprise a series of NAL units. The NAL units of the bitstream may include coded slice NAL units. As part of decoding the bitstream, entropy decoding unit 150 may obtain (e.g., extract) and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to obtaining (e.g., decoding) syntax elements from the bitstream, video decoder 30 may perform a reconstruction operation on CUs. To perform the reconstruction operation on a CU (e.g., a non-partitioned CU), video decoder 30 may perform a reconstruction operation on each TU of the CU. By performing the reconstruction operation for each TU of the CU, video decoder 30 may reconstruct residual blocks (i.e., transform blocks) of the TUs of the CU.

As part of performing a reconstruction operation on a TU of a CU, inverse quantization unit 154 may inverse quantize, i.e., de-quantize, coefficient blocks of (i.e., associated with) the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. For instance, intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements obtained from the bitstream. Furthermore, if a PU is encoded using inter prediction, entropy decoding unit 150 may determine (e.g., extract) motion information for the PU. Motion compensation unit 164 may determine, based on the motion information of the PU, one or more reference blocks for the PU. Motion compensation unit 164 may generate, based on samples blocks at the one or more reference blocks for the PU, predictive blocks (e.g., predictive luma, Cb and Cr blocks) for the PU.

As indicated above, video encoder 20 may signal the motion information of a PU using merge mode, skip mode or AMVP mode. When video encoder 20 signals the motion information of a current PU using AMVP mode, entropy decoding unit 150 may decode, from the bitstream, a reference index, a MVD for the current PU, and a candidate index. Furthermore, motion compensation unit 164 may generate an AMVP candidate list for the current PU. The AMVP candidate list includes one or more motion vector predictor candidates. Each of the motion vector predictor candidates specifies a motion vector of a PU that spatially or temporally neighbors the current PU. Motion compensation unit 164 may determine, based at least in part on the candidate index, a selected motion vector predictor candidate in the AMVP candidate list. Motion compensation unit 164 may then determine the motion vector of the current PU by adding the MVD to the motion vector specified by the selected motion vector predictor candidate. In other words, for AMVP, the motion vector is calculated as motion vector (MV)=MVP+MVD, wherein the index of the motion vector predictor (MVP) is signaled and the MVP is one of the motion vector candidates (spatial or temporal) from the AMVP list, and the MVD is signaled to the decoder side.

If the current PU is bi-predicted and the motion information of the PU is signaled in AMVP mode, entropy decoding unit 150 may decode an additional reference index, MVD, and candidate index from the bitstream. Motion compensation unit 162 may repeat the process described above using the additional reference index, MVD, and candidate index to derive a second motion vector for the current PU. In this way, motion compensation unit 162 may derive a motion vector for RefPicList0 (i.e., a RefPicList0 motion vector) and a motion vector for RefPicList1 (i.e., a RefPicList1 motion vector).

In accordance with one or more techniques of this disclosure, motion compensation unit 164 may generate a list of merging candidates for coding a video block of 3D video. As part of generating the list of merging candidates, motion compensation unit 164 may determine whether a number of merging candidates in the list of merging candidates is less than 5. In response to determining that the number of merging candidates in the list of merging candidates is less than 5, motion compensation unit 164 may derive one or more combined bi-predictive merging candidates. Motion compensation unit 164 may include the one or more combined bi-predictive merging candidates in the list of merging candidates. Furthermore, in some examples, video decoder 30 may obtain, from a bitstream, a syntax element indicating a selected merging candidate in the list of merging candidates. Motion compensation unit 164 may use motion information of the selected candidate to generate predictive samples of the current PU. In some examples, the maximum number of merging candidates in the list of merging candidates is equal greater than 5 (e.g., 6).

Continuing reference is now made to FIG. 9. Reconstruction unit 158 may use the transform blocks (e.g., luma, Cb and Cr transform blocks) of TUs of a CU and the predictive blocks (e.g., predictive luma, Cb and Cr blocks) of the PUs of the CU, i.e., either intra-prediction data or inter-prediction data, as applicable, to reconstruct the coding blocks (e.g., luma, Cb and Cr coding blocks) of the CU. For example, reconstruction unit 158 may add samples of the transform blocks (e.g., luma, Cb and Cr transform blocks) to corresponding samples of the predictive blocks (e.g., predictive luma, Cb and Cr blocks) to reconstruct the coding blocks (e.g., luma, Cb and Cr coding blocks) of the CU.

Filter unit 160 may perform a deblocking operation to reduce blocking artifacts associated with the coding blocks (e.g., luma, Cb and Cr coding blocks) of the CU. Video decoder 30 may store the coding blocks (e.g., luma, Cb and Cr coding blocks) of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks (e.g., luma, Cb and Cr blocks) in decoded picture buffer 162, intra prediction or inter prediction operations on PUs of other CUs. In this way, video decoder 30 may obtain, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

FIG. 10A is a flowchart illustrating an example operation of video encoder 20 to encode data associated with 3D video, in accordance with one or more techniques of this disclosure. The operation of FIG. 10A, along with operations illustrated in other flowcharts of this disclosure, are examples. Other example operations in accordance with the techniques of this disclosure may include more, fewer, or different actions.

Figure 11:
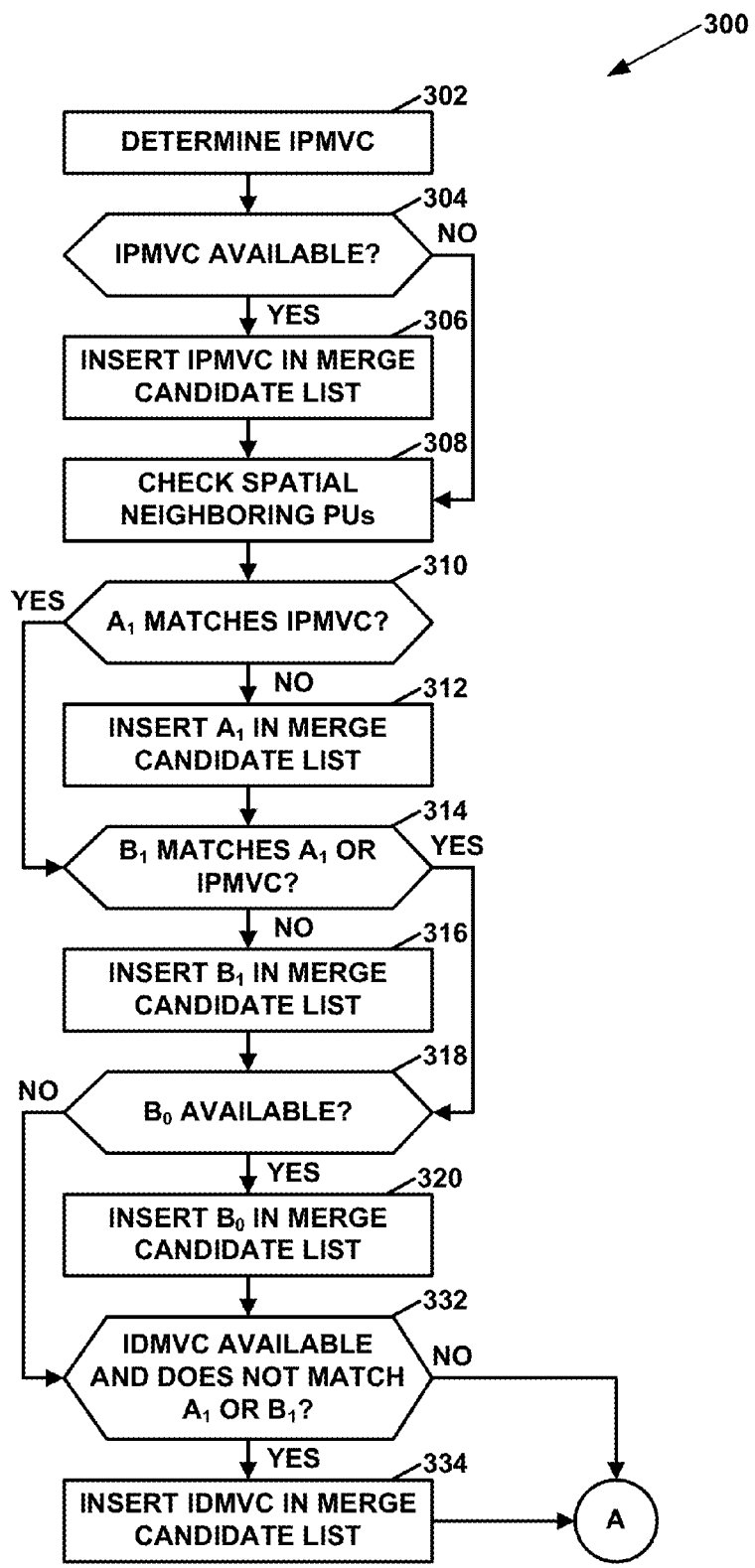
FIG. 11 is a flowchart illustrating a first portion of an example operation to construct a merge candidate list for a current block, in accordance with one or more techniques of this disclosure.
Figure 12:
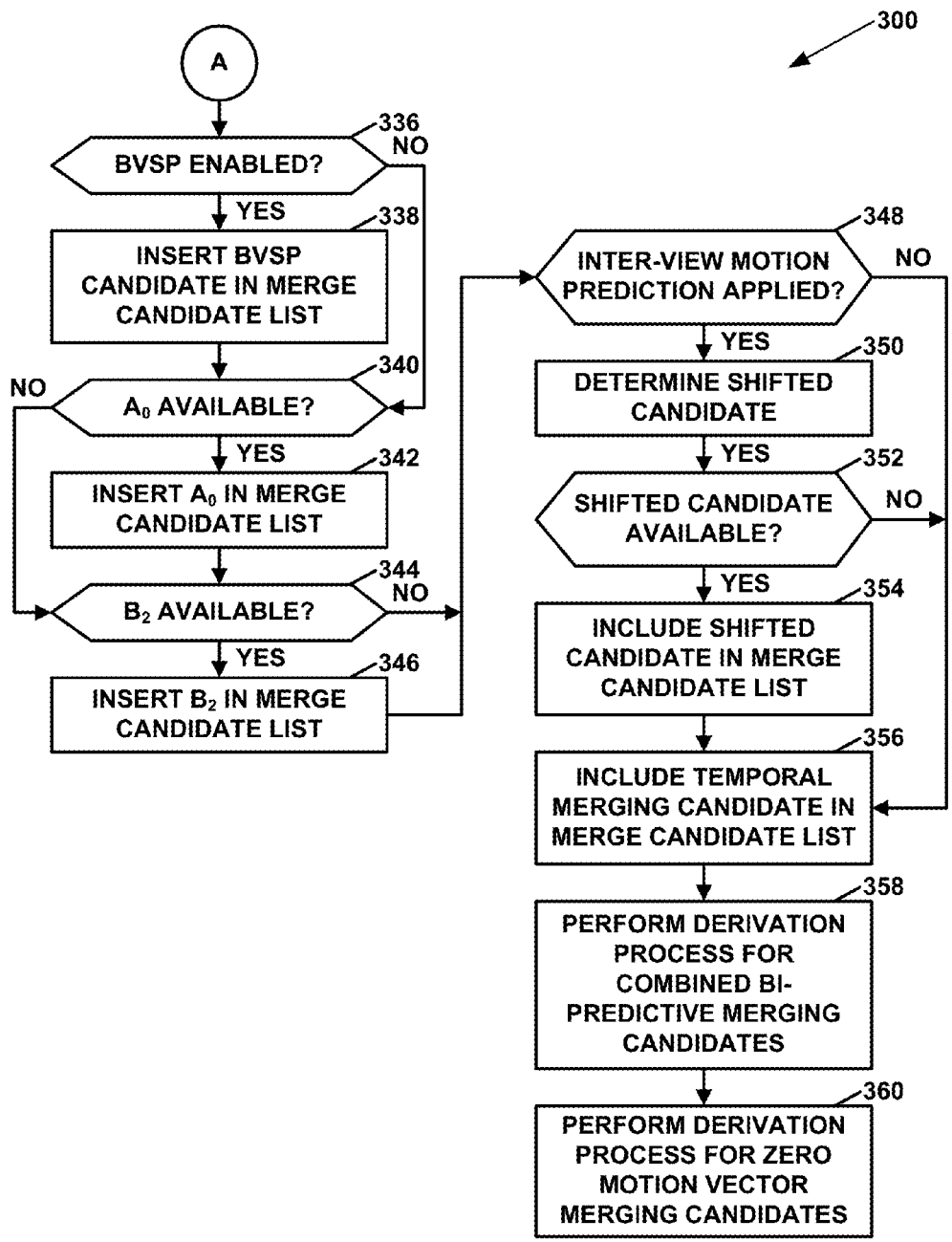
FIG. 12 is a flowchart illustrating a second portion of the example operation of FIG. 11 to construct a merge candidate list for a current block, in accordance with one or more techniques of this disclosure.

In the example of FIG. 10A, video encoder 20 may generate a list of merging candidates (200). In other words, video encoder 20 may generate a merge candidate list. FIGS. 11 and 12, described elsewhere in this disclosure, illustrate an example operation for generating the list of merging candidates. In some examples, video encoder 20 may generate the merge candidate list in the same manner as video decoder 30. In accordance with one or more techniques of this disclosure, when video encoder 20 generates the merge candidate list, video encoder 20 may determine whether a number of merge candidates in the merge candidate list is less than 5. In response to determining that the number of merge candidates in the merge candidate list is less than 5, video encoder 20 may derive one or more bi-predictive merging candidates. Video encoder 20 may include the one or more bi-predictive merging candidates in the merge candidate list. In some examples, the maximum number of merging candidates in the merge candidate list is equal to 6.

Furthermore, in the example of FIG. 10A, video encoder 20 may select a candidate in the list of merging candidates (202). In some examples, video encoder 20 may signal the selected candidate in a bitstream. For instance, video encoder 20 may include a merge index syntax element in the bitstream. Video encoder 20 may encode a video block based on the selected candidate (204). For example, the video block may be a CU. In this example, video encoder 20 may use the motion information (e.g., motion vectors, reference indices, etc.) of the selected candidate to determine a predictive block for a PU of the CU. Furthermore, in this example, video encoder 20 may determine values of at least some samples of a transform block (e.g., a residual block) based on samples of the predictive block and corresponding samples of a coding block of the CU. For instance, video encoder 20 may determine values of at least some of the samples of the transform block such that the samples are equal to differences between samples of the predictive block and corresponding samples of a coding block of the CU.

FIG. 10B is a flowchart illustrating an example operation of video decoder 30 to decode data associated with 3D video, in accordance with one or more techniques of this disclosure. In the example of FIG. 10B, video decoder 30 may generate a list of merging candidates (220). In other words, video decoder 30 may generate a merge candidate list. FIGS. 11 and 12, described elsewhere in this disclosure, illustrate an example operation for generating the list of merging candidates. In some examples, video decoder 30 may generate the merging candidate list in the same manner as video encoder 20. In accordance with one or more techniques of this disclosure, when video decoder 30 generates the merging candidate list, video decoder 30 may determine whether a number of merging candidates in the merging candidate list is less than 5. In response to determining that the number of merging candidates in the merging candidate list is less than 5, video decoder 30 may derive one or more bi-predictive merging candidates. Video decoder 30 may include the one or more bi-predictive merging candidates in the merging candidate list. In some examples, the maximum number of merging candidates in the merging candidate list is equal to 6.

Furthermore, in the example of FIG. 10B, video decoder 30 may determine a selected candidate in the list of merging candidates (222). In some examples, video decoder 30 may determine the selected candidate based on a value indicated by a syntax element signaled in a bitstream. Video decoder 30 may decode a video block based on the selected candidate (224). For example, the video block may be a CU. In this example, video decoder 30 may use the motion information (e.g., motion vectors, reference indices, etc.) of the selected candidate to determine a predictive block for a PU of the CU. Furthermore, in this example, video decoder 30 may determine values of at least some of the samples of a coding block of the CU based on the predictive block. For instance, video decoder 30 may determine values of at least some of the samples of the coding block such that the samples are equal to sums of samples of the predictive block and corresponding samples of a transform block of a TU of the CU.

FIG. 11 is a flowchart illustrating a first portion of an example operation 300 to construct a merge candidate list for a current block, in accordance with one or more techniques of this disclosure. In the example operation of FIG. 11, one or more actions may be rearranged or omitted. In other examples, similar operations may include additional actions.

In the example of FIG. 11, a video coder (e.g., video encoder 20 or video decoder 30) may determine an IPMVC (302). In some examples, the video coder may determine the IPMVC by using a disparity vector for the current block to identify a corresponding block in an inter-view reference picture. In such examples, if the corresponding block is not intra predicted and not inter-view predicted and has a temporal motion vector (i.e., a motion vector that indicates a location in a reference picture associated with a different time instance than the corresponding block), the IPMVC may specify the motion vectors of the corresponding block, prediction direction indicators of the corresponding block, and converted reference indices of the corresponding block. Subsequently, the video coder may determine whether the IPMVC is available (304). In some examples, the IPMVC is unavailable if the corresponding block in the inter-view reference picture is intra predicted or outside the boundaries of the inter-view reference picture. Responsive to determining that the IPMVC is available ("YES" of 304), the video coder may insert the IPMVC in the merge candidate list (306).

After inserting the IPMVC in the merge candidate list or in response to determining that the IPMVC is not available ("NO" of 304), the video coder may check spatial neighboring PUs to determine whether the spatial neighboring PUs have available motion vectors (308). In some examples, the spatial neighboring PUs cover the locations indicated $A_0$, $A_1$, $B_0$, $B_1$, and $B_2$ in FIG. 2. For ease of explanation, this disclosure may refer to the motion information of PUs covering the locations $A_0$, $A_1$, $B_0$, $B_1$, and $B_2$ as $A_0$, $A_1$, $B_0$, $B_1$, and $B_2$, respectively.

In the example of FIG. 11, the video coder may determine whether $A_1$ matches the IPMVC (310). Responsive to determining that $A_1$ does not match the IPMVC ("NO" of 310), the video coder may insert $A_1$ into the merge candidate list (312). Otherwise, responsive to determining that $A_1$ matches the IPMVC ("YES" of 310) or after inserting $A_1$ into the merge candidate list, the video coder may determine whether $B_1$ matches $A_1$ or the IPMVC (314). Responsive to determining that $B_1$ does not match $A_1$ or the IPMVC ("NO" of 314), the video coder may insert $B_1$ into the merge candidate list (316). On the other hand, responsive to determining that $B_1$ matches $A_1$ or the IPMVC ("YES" of 314) or after inserting $B_1$ into the merge candidate list, the video coder may determine whether $B_0$ is available (318). Responsive to determining that $B_0$ is available ("YES" of 318), the video coder may insert $B_0$ into the merge candidate list (320). If $B_0$ is not available ("NO" of 318) or after inserting $B_0$ into the merge candidate list, the video coder may determine whether the IDMVC is available and does not match $A_1$ or $B_1$ (332). The IDMVC may specify the disparity vector for the current PU. The IDMVC may be unavailable if the IDMVC indicates a location that is outside the boundaries of an inter-view reference picture. Responsive to determining that the IDMVC is available and does not match $A_1$ or $B_1$ ("YES" of 332), the video coder may insert the IDMVC into the merge candidate list (334). If the IDMVC is not available or the IDMVC matches $A_1$ or $B_1$ ("NO" of 332) or after inserting the IDMVC into the merge candidate list, the video coder may perform the portion of operation 300 shown in FIG. 12 (denoted by "A").

FIG. 12 is a flowchart illustrating a second portion of the example operation 300 of FIG. 11 to construct a merge candidate list for a current block, in accordance with one or more techniques of this disclosure. As indicated above, the video coder may perform the portion of operation 300 shown in FIG. 12 if the IDMVC is not available or the IDMVC matches $A_1$ or $B_1$ ("NO" of 332) or after inserting the IDMVC into the merge candidate list. Hence, if the IDMVC is not available or the IDMVC matches $A_1$ or $B_1$ ("NO" of 332) or after inserting the IDMVC into the merge candidate list, the video coder may determine whether BVSP is enabled (336). If BVSP is enabled ("YES" of 336), the video coder may insert a BVSP candidate into the merge candidate list (338). If BVSP is not enabled ("NO" of 336) or after inserting the BVSP candidate into the merge candidate list, the video coder may determine whether $A_0$ is available (340). If $A_0$ is available ("YES" of 340), the video coder may insert $A_0$ into the merge candidate list (342). Otherwise, if $A_0$ is not available ("NO" of 340) or after inserting $A_0$ into the merge candidate list, the video coder may determine whether $B_2$ is available (344). If $B_2$ is available ("YES" of 344), the video coder may insert $B_2$ into the merge candidate list (346).

If $B_2$ is not available ("NO" of 344) or after inserting $B_2$ into the merge candidate list, the video coder may determine whether inter-view motion prediction is applied (348). In other words, the video coder may determine whether the current block may be coded using inter-view motion prediction. In response to determining that inter-view motion prediction is applied ("YES" of 348), the video coder may determine a shifted candidate (350). In other words, the video coder may determine a DSMV candidate, as described elsewhere in this disclosure. After determining the shifted candidate, the video coder may determine whether the shifted candidate is available (352). If the shifted candidate is available ("YES" of 352), the video coder may include the shifted candidate in the merge candidate list (354). If inter-view motion prediction is not applied ("NO" of 348), the shifted candidate is not available ("NO" of 352), or after including the shifted candidate in the merge candidate list, the video coder may include a temporal merging candidate in the merge candidate list (356).

Furthermore, the video coder may perform a derivation process for combined bi-predictive merging candidates (358). An example derivation process for combined bi-predictive merging candidates in accordance with one or more techniques of this disclosure is described below with regard to FIG. 13. In addition, the video coder may perform a derivation process for zero motion vector candidates (360). An example derivation process for zero motion vector candidates is described in section 8.5.3.2.4 of HEVC WD 10.

Figure 13:
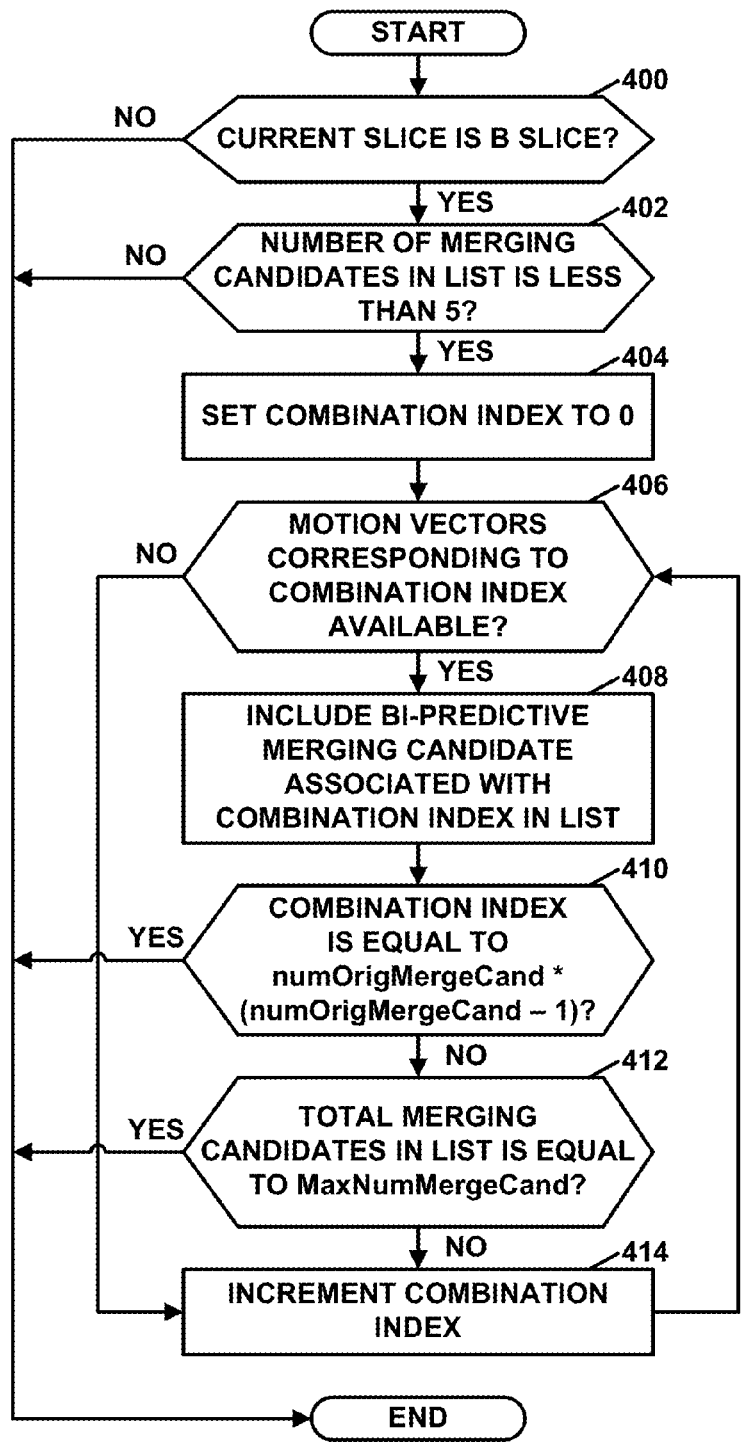
FIG. 13 is a flowchart illustrating an example derivation process for combined bi-predictive merging candidates, in accordance with one or more techniques of this disclosure.

FIG. 13 is a flowchart illustrating an example derivation process for combined bi-predictive merging candidates, in accordance with one or more techniques of this disclosure. The derivation process of FIG. 13 may be performed without checking any BVSP flags. For instance, the derivation process of FIG. 13 may be performed without providing mergeCandIsVspFlag as input to the derivation process for combined bi-predictive merging candidates, as is done in section H.8.5.3.2.1 of 3D-HEVC Draft Text 1. Furthermore, the derivation process of FIG. 13 may be performed without using mergeCandIsVspFlag in the derivation process for combined bi-predictive merging candidates, as is done in section H.8.5.3.2.3 of 3D-HEVC Draft Text 1.

In the example of FIG. 13, a video coder (e.g., video encoder 20 or video decoder 30) may determine whether a current slice (i.e., a slice that the video coder is currently coding) is a B slice (400). If the current slice is not a B slice ("NO" of 400), the video coder may end the derivation process for combined bi-predictive merging candidates. However, in response to determining that the current slice is a B slice ("YES" of 400), the video coder may determine whether the number of merging candidates in the list of merging candidates (i.e., the merge candidate list) is less than 5 (402). If the number of merging candidates in the list of merging candidates is not less than 5, the video coder may end the derivation process for combined bi-predictive merging candidates.

On the other hand, in response to determining that the number of merging candidates in the list of merging candidates is less than 5 ("YES" of 402), the video coder may set a value of a combination index (e.g., combIdx) to 0 (404). The video coder may then determine whether motion vectors corresponding to the current value of the combination index are available (406).

In response to determining that the motion vectors corresponding to the current value of the combination index are available ("YES" of 406), the video coder may include a combined bi-predictive merging candidate associated with the current value of the combination index in the list of merging candidates (408). The combined bi-predictive merging candidate associated with the current value of the combination index may specify RefPicList0 motion information and RefPicList1 motion information in accordance with Table 1.

Furthermore, the video coder may determine whether the current value of the combination index is equal to (numOrigMergeCand*(numOrigMergeCand−1)), where numOrig- MergeCand denotes the number of merging candidates in the list of merging candidates before invoking the derivation process of FIG. 13 (410). If the current value of the combination index is equal to (numOrigMergeCand*(numOrigMergeCand−1)) ("YES" of 410), the video coder may end the derivation process for combined bi-predictive merging candidates. On the other hand, if the current value of the combination index is not equal to (numOrigMergeCand*(numOrigMergeCand−1)) ("NO" of 410), the video coder may determine whether a total number of merging candidates in the list of merging candidates is equal to MaxNumMergeCand (412). As indicated elsewhere in this disclosure, MaxNumMergeCand indicates a maximum number of merging candidates in the list of merging candidates. If the total number of merging candidates in the list of merging candidates is equal to MaxNumMergeCand ("YES" of 412), the video coder may end the derivation process for combined bi-predictive merging candidates.

However, in response to determining that the total number of merging candidates in the list of merging candidates is not equal to MaxNumMergeCand ("NO" of 412) or in response to determining that the motion vectors corresponding to the current value of the combination index are not available ("NO" of 406), the video coder may increment the current value of the combination index (414). The video coder may then perform actions (406)-(414) with regard to the incremented value of the combination index. In this way, the video coder may continue deriving combined bi-predictive merging candidates until the current value of the combination index is equal to (numOrigMergeCand*(numOrigMergeCand−1)) or the number of total candidates (including newly generated combined bi-predictive merging candidates) in the merge list is equal to MaxNumMergeCand.

FIG. 14A is a flowchart illustrating an example operation of video encoder 20 to encode a video block, in accordance with one or more techniques of this disclosure. In the example of FIG. 14A, video encoder 20 may generate a list of merging candidates (450). In other words, video encoder 20 may generate a merge candidate list. In the example of FIG. 14A, video encoder 20 may determine whether a number of merging candidates in the list is less than 5 (452). In some examples, video encoder 20 may, in this step, determine whether the number of merging candidates in the list is less than 5 and the maximum number of merging candidates in the list is greater than 5 (e.g., equal to 6). In response to determining that the number of merging candidates in the list is less than 5 ("YES" of 452), video encoder 20 may derive one or more combined bi-predictive merging candidates (454) and include the one or more combined bi-predictive merging candidates in the list of merging candidates (456). Each respective combined bi-predictive merging candidate of the one or more combined bi-predictive merging candidates may correspond to a respective pair of merging candidates already in the list. The respective combined bi-predictive merging candidate may be a combination of a motion vector of a first merging candidate of the respective pair and a motion vector of a second merging candidate of the respective pair. The motion vector of the first merging candidate and the motion vector of the second merging candidate refer to pictures in different reference picture lists (e.g., list 0 and list 1). On the other hand, in some examples, if the number of merging candidates in the list is not less than 5 ("NO" of 452), video encoder 20 does not include any combined bi-predictive merging candidates in the list (458).

In some examples, video encoder 20 may derive the one or more combined bi-predictive merging candidates after inserting an IPMVC, if available, in the list of merging candidates, after performing a derivation process for spatial merging candidates, and after performing a derivation process for a temporal merging candidate. The derivation process for spatial merging candidates may derive and insert up to four spatial motion vector candidates in the list of merging candidates. The derivation process for the temporal merging candidate may add a temporal motion vector predictor (TMVP) candidate, if available, to the list of merging candidates.

Furthermore, in the example of FIG. 14A, video encoder 20 may select a candidate in the list of merging candidates (460). In some examples, video encoder 20 may determine the selected candidate based on a value indicated by a syntax element signaled in a bitstream. In addition, video encoder 20 may signal a position in the list of merging candidates of the selected merging candidate (462). Video encoder 20 may encode a video block based on the selected candidate (464). Video encoder 20 may encode the video block in accordance with one or more of the examples provided elsewhere in this disclosure.

FIG. 14B is a flowchart illustrating an example operation of video decoder 30 to decode a video block, in accordance with one or more techniques of this disclosure. In the example of FIG. 14B, video decoder 30 may generate a list of merging candidates (480). In the example of FIG. 14B, video decoder 30 may determine whether a number of merging candidates in the list is less than 5 (482). In some examples, video decoder 30 may, in this step, determine whether the number of merging candidates in the list is less than 5 and the maximum number of merging candidates in the list is greater than 5 (e.g., equal to 6). In response to determining that the number of merging candidates in the list is less than 5 ("YES" of 452), video decoder 30 may derive one or more combined bi-predictive merging candidates (484). Each respective combined bi-predictive merging candidate of the one or more combined bi-predictive merging candidates may correspond to a respective pair of merging candidates already in the list. The respective combined bi-predictive merging candidate may be a combination of a motion vector of a first merging candidate of the respective pair and a motion vector of a second merging candidate of the respective pair. The motion vector of the first merging candidate and the motion vector of the second merging candidate refer to pictures in different reference picture lists (e.g., list 0 and list 1). Video decoder 30 may include the one or more combined bi-predictive merging candidates in the list (486). On the other hand, in some examples, if the number of merging candidates in the list is not less than 5 ("NO" of 482), video decoder 30 does not include any combined bi-predictive merging candidates in the list (488).

In some examples, video decoder 30 may derive the one or more combined bi-predictive merging candidates after inserting an IPMVC, if available, in the list of merging candidates, after performing a derivation process for spatial merging candidates, and after performing a derivation process for a temporal merging candidate. The derivation process for spatial merging candidates may derive and insert up to four spatial motion vector candidates in the list of merging candidates. The derivation process for the temporal merging candidate may add a temporal motion vector predictor (TMVP) candidate, if available, to the list of merging candidates.

Furthermore, in the example of FIG. 14B, video decoder 30 may determine a selected candidate in the list of merging candidates (490). In some examples, video decoder 30 may determine the selected candidate based on a value indicated by a syntax element signaled in a bitstream. For instance, video decoder 30 may obtain, from a bitstream, a syntax element indicating a selected merging candidate in the list of merging candidates. Video decoder 30 may decode a video block based on the selected candidate (492). For instance, video decoder 30 may use motion information of the selected candidate to generate predictive samples of a current PU. The video decoder 30 may decode the video block (e.g., a CU, PU, etc.) in accordance with one or more of the examples provided elsewhere in this disclosure.

The following paragraphs provide additional examples of this disclosure

Example 1

A method of coding video data, the method comprising: generating a first list of merging candidates according to a first process for coding a video block that is not associated with three-dimensional video data, wherein the first list includes one or more bi-predictive merging candidates; and generating a second list of merging candidates according to a second process for coding a video block that is associated with three-dimensional video data, wherein the second list includes one or more bi-predictive merging candidates, wherein the first process and the second process are the same.

Example 2

The method of example 1, wherein generating the first list and generating the second list occurs only when the following condition is satisfied: a number of available merging candidates is less than 5.

Example 3

The method of any of examples 1 or 2, further comprising defining a maximum number of merging MVP candidates prior to invoking a derivation process for generating any merge list.

Example 4

The method of example 4, wherein the maximum number of merging MVP candiddates is defined subsantially as follows: MaxNumMergeCand=5–five_minus_max_num_merge_cand, and then after this process is inovked, the MaxNumMergeCand is set back to: MaxNumMergeCand=5–five_minus_max_num_merge_cand+iv_mv_pred_flag[nu h_layer_id].

Example 5

A method of coding data associated with three-dimensional (3D) video, the method comprising: generating a list of merging candidates for coding a video block associated with 3D video, wherein the list includes one or more bi-predictive merging candidates and wherein when a maximum number of merging candidates is equal to 6 and there are 5 candidates defined before a derivation process of combined bi-predictive merging candidates is invoked, a zero candidate is generated and included in the list, wherein the zero candidate defines a reference index and motion vector components as 0.

Example 6

A method of coding data associated with three-dimensional (3D) video, the method comprising: generating a list of merging candidates for coding a video block associated with 3D video, wherein the list includes one or more bi-predictive merging candidates and wherein before generating the list, a maximum number of merging candidates is set to five, four of the candidates are input to a merge list derivation process, and one candidate is newly generated during the merge list derivation process.

Example 7

The method of example 6, wherein the newly generated candidate is ordered as a fifth candidate in the list.

Example 8

The method of example 6, wherein if the merge list derivation process is unable to generate a non-zero newly generated candidate, the merge list derivation process generates a zero value candidate as the newly generated candidate.

In one or more examples, the functions described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding three-dimensional (3D) video data, the method comprising:
   generating a current list of merging candidates for coding a video block of the 3D video data, wherein a maximum number of merging candidates in the current list of merging candidates is equal to 6, there are 20 possible combinations of list 0 and list 1 motion vectors of different bi-predictive merging candidates in lists of merging candidates having 5 bi-predictive merging candidates, and generating the current list of merging candidates comprises:
      determining that a number of merging candidates initially in the current list of merging candidates is less than 5, wherein each respective value of a combination index from 0 to 11 corresponds to a respective pre-defined combination of values from 0 to 3; and
      in response to determining that the number of merging candidates in the current list of merging candidates is less than 5, performing the following for each respective value of the combination index from 0 to 11 until at least one of the following conditions is true: the respective value of the combination index is equal to the number of merging candidates initially in the current list of merging candidates multiplied by one less than the number of merging candidates initially in the current list of merging candidates, and the current list of merging candidates has 6 merging candidates:
         determining whether a first merging candidate in the current list of merging candidates has a list 0 motion vector and whether a second merging candidate in the current list of merging candidates has a list 1 motion vector, wherein the first merging candidate and the second merging candidate are at positions in the current list of merging candidates indicated by the pre-defined combination of values corresponding to the respective value of the combination index;
         responsive to determining the first merging candidate has a list 0 motion vector and the second merging candidate has a list 1 motion vector, deriving a respective combined bi-predictive merging candidate, wherein the respective combined bi-predictive merging candidate is a combination of the list 0 motion vector of the first merging candidate and the list 1 motion vector of the second merging candidate, wherein the motion vector of the first merging candidate and the motion vector of the second merging candidate refer to pictures in different reference picture lists; and
         including the respective combined bi-predictive merging candidate in the current list of merging candidates.

2. The method of claim 1, wherein generating the current list of merging candidates further comprises:
   in response to determining that there are 5 merging candidates in the current list of merging candidates prior to adding any of the one or more bi-predictive merging candidates to the current list of merging candidates, including a zero candidate in the current list of merging candidates, wherein motion vector components of the zero candidate are equal to 0 and a reference index of the zero candidate is equal to 0, the reference index indicating a location of a reference picture in a reference picture list.

3. The method of claim 1, wherein generating the current list of merging candidates occurs without checking any backward warping view synthesis (BVSP) flags.

4. The method of claim 1, wherein the method of coding the 3D video data comprises a method of decoding the 3D video data and the video block is a prediction unit (PU), the method further comprising:
   obtaining, from a bitstream, a syntax element indicating a selected merging candidate in the current list of merging candidates; and
   using motion information of the selected candidate to generate predictive samples of the PU.

5. The method of claim 1, wherein the method of coding the 3D video data comprises a method of encoding the 3D video data, the method comprising:
   selecting a merging candidate in the current list of merging candidates; and
   signaling a position in the current list of merging candidates of the selected merging candidate.

6. The method of claim 1, wherein:
   generating the current list of merging candidates comprises deriving the one or more combined bi-predictive merging candidates after inserting an inter-view prediction motion vector candidate (IPMVC), if available, in the current list of merging candidates, after performing a derivation process for spatial merging candidates, and after performing a derivation process for a temporal merging candidate,
   the derivation process for spatial merging candidates derives and inserts up to four spatial motion vector candidates in the current list of merging candidates, and
   the derivation process for the temporal merging candidate adds a temporal motion vector predictor (TMVP) candidate, if available, to the current list of merging candidates.

7. A video coding device comprising:
   a data storage medium configured to store three-dimensional (3D) video data; and
   one or more processors configured to:
      generate a current list of merging candidates for coding a video block of the 3D video data, wherein a maximum number of merging candidates in the current list of merging candidates is equal to 6, there are 20 possible combinations of list 0 and list 1 motion vectors of different bi-predictive merging candidates in lists of merging candidates having 5 bi-predictive merging candidates, and as part of generating the current list of merging candidates, the one or more processors:

determine that a number of merging candidates initially in the current list of merging candidates is less than 5, wherein each respective value of a combination index from 0 to 11 corresponds to a respective pre-defined combination of values from 0 to 3; and in response to determining that the number of merging candidates in the current list of merging candidates is less than 5, perform the following for each respective value of the combination index from 0 to 11 until at least one of the following conditions is true: the respective value of the combination index is equal to the number of merging candidates initially in the current list of merging candidates multiplied by one less than the number of merging candidates initially in the current list of merging candidates, and the current list of merging candidates has 6 merging candidates:

determine whether a first mer in candidate in the current list of merging candidates has a list 0 motion vector and whether a second merging candidate in the current list of merging candidates has a list 1 motion vector, wherein the first merging candidate and the second merging candidate are at positions in the current list of merging candidates indicated by the pre-defined combination of values corresponding to the respective value of the combination index;

responsive to determining the first merging candidate has a list 0 motion vector and the second merging candidate has a list 1 motion vector, derive a respective combined bi-predictive merging candidate, wherein the respective combined bi-predictive merging candidate is a combination of the list 0 motion vector of the first merging candidate and the list 1 motion vector of the second merging candidate, wherein the motion vector of the first merging candidate and the motion vector of the second merging candidate refer to pictures in different reference picture lists; and include the respective combined bi-predictive merging candidate in the current list of merging candidates.

8. The video coding device of claim 7, wherein as part of generating the current list of merging candidates, the one or more processors:

include, in response to determining that there are 5 merging candidates in the current list of merging candidates prior to adding any of the one or more bi-predictive merging candidates to the current list of merging candidates, a zero candidate in the current list of merging candidates, wherein motion vector components of the zero candidate are equal to 0 and a reference index of the zero candidate is equal to 0, the reference index indicating a location of a reference picture in a reference picture list.

9. The video coding device of claim 7, wherein the one or more processors generate the current list of merging candidates without checking any backward warping view synthesis (BVSP) flags.

10. The video coding device of claim 7, wherein the one or more processors are configured to decode the 3D video data and the video block is a prediction unit (PU), the one or more processors being configured to:

obtain, from a bitstream, a syntax element indicating a selected merging candidate in the current list of merging candidates; and use motion information of the selected candidate to generate predictive samples of the PU.

11. The video coding device of claim 7, wherein the one or more processors are configured to encode the 3D video data, the one or more processors being configured to:

select a merging candidate in the current list of merging candidates; and signal a position in the current list of merging candidates of the selected merging candidate.

12. The video coding device of claim 7, wherein:

the one or more processors are configured to derive the one or more combined bi-predictive merging candidates after inserting an inter-view prediction motion vector candidate (IPMVC), if available, in the current list of merging candidates, after performing a derivation process for spatial merging candidates, and after performing a derivation process for a temporal merging candidate, the derivation process for spatial merging candidates derives and inserts up to four spatial motion vector candidates in the current list of merging candidates, and the derivation process for the temporal merging candidate adds a temporal motion vector predictor (TMVP) candidate, if available, to the current list of merging candidates.

13. A video coding device comprising:

means for storing three-dimensional (3D) video data; and means for generating a current list of merging candidates for coding a video block of the 3D video data, wherein a maximum number of merging candidates in the current list of merging candidates is equal to 6, there are 20 possible combinations of list 0 and list 1 motion vectors of different bi-predictive merging candidates in lists of mer in candidates having 5 bi-predictive merging candidates, and the means for generating the current list of merging candidates comprises:

means for determining that a number of merging candidates initially in the current list of merging candidates is less than 5, wherein each respective value of a combination index from 0 to 11 corresponds to a respective pre-defined combination of values from 0 to 3; and means for performing the following for each respective value of the combination index from 0 to 11 until at least one of the following conditions is true: the respective value of the combination index is equal to the number of merging candidates initially in the current list of merging candidates multiplied by one less than the number of merging candidates initially in the current list of merging candidates, and the current list of merging candidates has 6 merging candidates in response to determining that the number of merging candidates in the current list of merging candidates is less than 5:

determine whether a first merging candidate in the current list of merging candidates has a list 0 motion vector and whether a second merging candidate in the current list of merging candidates has a list 1 motion vector, wherein the first mer in candidate and the second merging candidate are at positions in the current list of merging candidates indicated by the pre-defined combination of values corresponding to the respective value of the combination index;

responsive to determining the first merging candidate has a list 0 motion vector and the second merging candidate has a list 1 motion vector, a respective combined bi-predictive merging candidate, wherein the respective combined bi-predictive merging candidate is a combination of the list 0 motion vector of the first merging candidate and the list 1 motion vector of the second merging candidate, wherein the motion vector of the first merging candidate and the motion vector of the second merging candidate refer to pictures in different reference picture lists; and include the respective combined bi-predictive merging candidate in the current list of merging candidates.

14. The video coding device of claim 13, wherein the means for generating the current list of merging candidates further comprises:

means for including, in response to determining that there are 5 merging candidates in the current list of merging candidates prior to adding any of the one or more bi-predictive merging candidates to the current list of merging candidates, a zero candidate in the current list of merging candidates, wherein motion vector components of the zero candidate are equal to 0 and a reference index of the zero candidate is equal to 0, the reference index indicating a location of a reference picture in a reference picture list.

15. The video coding device of claim 13, wherein generating the current list of merging candidates occurs without checking any backward warping view synthesis (BVSP) flags.

16. The video coding device of claim 13, wherein the video coding device decodes the 3D video data and the video block is a prediction unit (PU), the video coding device further comprising:

means for obtaining, from a bitstream, a syntax element indicating a selected merging candidate in the current list of merging candidates; and means for using motion information of the selected candidate to generate predictive samples of the PU.

17. The video coding device of claim 13, wherein the video coding device encodes the 3D video data and the video coding device comprises:

means for selecting a merging candidate in the current list of merging candidates; and means for signaling a position in the current list of merging candidates of the selected merging candidate.

18. The video coding device of claim 13, wherein:

generating the current list of merging candidates comprises deriving the one or more combined bi-predictive merging candidates after inserting an inter-view prediction motion vector candidate (IPMVC), if available, in the current list of merging candidates, after performing a derivation process for spatial merging candidates, and after performing a derivation process for a temporal merging candidate, the derivation process for spatial merging candidates derives and inserts up to four spatial motion vector candidates in the current list of merging candidates, and the derivation process for the temporal merging candidate adds a temporal motion vector predictor (TMVP) candidate, if available, to the current list of merging candidates.

19. A non-transitory computer-readable data storage medium having instructions stored thereon that when executed cause a video coding device to code three-dimensional (3D) video data, the instructions causing the video coding device to:

generate a current list of merging candidates for coding a video block of the 3D video data, wherein a maximum number of merging candidates in the current list of merging candidates is equal to 6, there are 20 possible combinations of list 0 and list 1 motion vectors of different bi-predictive merging candidates in lists of merging candidates having 5 bi-predictive merging candidates, and as part of generating the current list of merging candidates, the one or more processors:

determine that a number of merging candidates initially in the current list of merging candidates is less than 5, wherein each respective value of a combination index from 0 to 11 corresponds to a respective pre-defined combination of values from 0 to 3; and in response to determining that the number of merging candidates in the current list of merging candidates is less than 5, performing the following for each respective value of the combination index from 0 to 11 until at least one of the following conditions is true: the respective value of the combination index is equal to the number of merging candidates initially in the current list of merging candidates multiplied by one less than the number of merging candidates initially in the current list of merging candidates, and the current list of merging candidates has 6 merging candidates:

determine whether a first merging candidate in the current list of merging candidates has a list 0 motion vector and whether a second merging candidate in the current list of merging candidates has a list 1 motion vector, wherein the first merging candidate and the second merging candidate are at positions in the current list of merging candidates indicated by the pre-defined combination of values corresponding to the respective value of the combination index;

responsive to determining the first merging candidate has a list 0 motion vector and the second merging candidate has a list 1 motion vector, derive a respective combined bi-predictive merging candidate, wherein the respective combined bi-predictive merging candidate is a combination of the list 0 motion vector of the first merging candidate and the list 1 motion vector of the second merging candidate, wherein the motion vector of the first merging candidate and the motion vector of the second merging candidate refer to pictures in different reference picture lists; and include the respective combined bi-predictive merging candidate in the current list of merging candidates.

20. The non-transitory computer-readable data storage medium of claim 19, wherein as part of causing the video coding device to generate the current list of merging candidates, the instructions cause the video coding device to:
in response to determining that there are 5 merging candidates in the current list of merging candidates prior to adding any of the one or more bi-predictive merging candidates to the current list of merging candidates, include a zero candidate in the current list of merging candidates, wherein motion vector components of the zero candidate are equal to 0 and a reference index of the zero candidate is equal to 0, the reference index indicating a location of a reference picture in a reference picture list.

21. The non-transitory computer-readable data storage medium of claim 19, wherein the instructions cause the video coding device to generate the current list of merging candidates without checking any backward warping view synthesis (BVSP) flags.

22. The non-transitory computer-readable data storage medium of claim 19, wherein the video block is a prediction unit (PU), the instructions further causing the video coding device to:
obtain, from a bitstream, a syntax element indicating a selected merging candidate in the current list of merging candidates; and
use motion information of the selected candidate to generate predictive samples of the PU.

23. The non-transitory computer-readable data storage medium of claim 19, wherein the instructions further cause the video coding device to:
select a merging candidate in the current list of merging candidates; and
signal a position in the current list of merging candidates of the selected merging candidate.

24. The non-transitory computer-readable data storage medium of claim 19, wherein the instructions cause the video coding device to derive the one or more combined bi-predictive merging candidates after inserting an interview prediction motion vector candidate (IPMVC), if available, in the current list of merging candidates, after performing a derivation process for spatial merging candidates, and after performing a derivation process for a temporal merging candidate,
wherein the derivation process for spatial merging candidates derives and inserts up to four spatial motion vector candidates in the current list of merging candidates, and
wherein the derivation process for the temporal merging candidate adds a temporal motion vector predictor (TMVP) candidate, if available, to the current list of merging candidates.

* * * * *